(12) United States Patent
Kawai et al.

(10) Patent No.: US 10,778,431 B2
(45) Date of Patent: Sep. 15, 2020

(54) ENCRYPTED TEXT CONVERSION DEVICE, COMPUTER READABLE MEDIUM, AND ENCRYPTION TEXT CONVERSION METHOD

(71) Applicant: MITSUBISHI ELECTRIC CORPORATION, Tokyo (JP)

(72) Inventors: Yutaka Kawai, Tokyo (JP); Takato Hirano, Tokyo (JP); Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 189 days.

(21) Appl. No.: 15/774,561

(22) PCT Filed: Jan. 18, 2016

(86) PCT No.: PCT/JP2016/051245
§ 371 (c)(1),
(2) Date: May 8, 2018

(87) PCT Pub. No.: WO2017/126001
PCT Pub. Date: Jul. 27, 2017

(65) Prior Publication Data
US 2019/0260585 A1 Aug. 22, 2019

(51) Int. Cl.
*H04L 9/30* (2006.01)
*H04L 9/00* (2006.01)
(Continued)

(52) U.S. Cl.
CPC .............. *H04L 9/3073* (2013.01); *G09C 1/00* (2013.01); *H04L 9/002* (2013.01); *H04L 9/008* (2013.01); *H04L 9/0825* (2013.01)

(58) Field of Classification Search
CPC .............................. H04L 9/008; H04L 9/002
See application file for complete search history.

(56) References Cited

U.S. PATENT DOCUMENTS

| 8,635,465 B1 * | 1/2014 | Juels | G06F 21/602 |
| | | | 713/193 |
| 2014/0115321 A1 | 4/2014 | Isshiki | |

(Continued)

FOREIGN PATENT DOCUMENTS

| JP | 2006-184831 A | 7/2006 |
| JP | 2012-195733 A | 10/2012 |

(Continued)

OTHER PUBLICATIONS

Boneh et al., "Evaluating 2-DNF Formulas on Ciphertexts," TCC 2005, 2005, pp. 325-341.

(Continued)

*Primary Examiner* — Ellen Tran
(74) *Attorney, Agent, or Firm* — Birch, Stewart, Kolasch & Birch, LLP

(57) ABSTRACT

An encryption device (500) includes an encryption unit (504), a detection element generation unit (505), and a transmission unit (506). The encryption unit (504) encrypts a plain text by using one of a pair of keys to generate an encrypted text into which the plain text has been encrypted and which can be subjected to homomorphic computation. The detection element generation unit (505) generates a detection element E used to detect a change in the encrypted text by using the one key and the encrypted text. The transmission unit (506) transmits the encrypted text and the detection element.

5 Claims, 17 Drawing Sheets

(51) Int. Cl.
*H04L 9/08* (2006.01)
*G09C 1/00* (2006.01)

(56) References Cited

U.S. PATENT DOCUMENTS

| | | |
|---|---|---|
| 2014/0208101 A1 | 7/2014 | Naganuma |
| 2015/0046708 A1 | 2/2015 | Yasuda et al. |
| 2015/0172258 A1 | 6/2015 | Komano et al. |
| 2015/0270964 A1 | 9/2015 | Yasuda et al. |
| 2015/0341174 A1 | 11/2015 | Mandal et al. |
| 2016/0080333 A1 | 3/2016 | Isshiki |
| 2016/0282923 A1 | 9/2016 | Itabashi et al. |

FOREIGN PATENT DOCUMENTS

| | | |
|---|---|---|
| JP | 2013-26995 A | 2/2013 |
| JP | 2013-205592 A | 10/2013 |
| JP | 2013-205655 A | 10/2013 |
| JP | 2013-205796 A | 10/2013 |
| JP | 2015-31935 A | 2/2015 |
| JP | 2015-114629 A | 6/2015 |
| JP | 2015-135407 A | 7/2015 |
| JP | 2015-184490 A | 10/2015 |
| WO | WO 2012/169153 A1 | 12/2012 |
| WO | WO 2013/046320 A1 | 4/2013 |
| WO | WO 2013/153628 A1 | 10/2013 |
| WO | WO 2014/010202 A1 | 1/2014 |
| WO | WO 2014/185450 A1 | 11/2014 |

OTHER PUBLICATIONS

Bresson et al., "A Simple Public-Key Cryptosystem with a Double Trapdoor Decryption Mechanism and Its Applications," ASIACRYPT 2003, 2003, pp. 37-54.

Catalano et al., "Boosting Linearly-Homomorphic Encryption to Evaluate Degree-2 Functions on Encrypted Data," IACR Cryptology ePrint Archive: Report 2014/813, 2014,28 pages.

Freeman, "Converting Pairing-Based Cryptosystems from Composite-Order Groups to Prime-Order Groups," EUROCRYPT 2010, 2010, pp. 44-61.

Gentry et al., "Homomorphic Encryption from Learning with Errors: Conceptually-Simpler, Asymptotically-Faster, Attribute-Based," Crypto 2013, Lecture Notes in Computer Science 8042, pp. 1-25.

Gentry, "Fully Homomorphic Encryption Using Ideal Lattices," STOC'09, Bethesda, Maryland, USA, May 31-Jun. 2, 2009, pp. 169-178.

Paillier,"Public-Key Cryptosystems Based on Composite Degree Residuosity Classes," EUROCRYPT'99, 1999, pp. 223-238.

Extended European Search Report issued in corresponding European Application No. 16886244.9 dated Dec. 17, 2018.

Xavier Boyen et al., "Direct Chosen Ciphertext Security from Identity-Based Techniques", Nov. 7-11, 2005, pp. 320-330.

Emura et al., "Chosen Ciphertext Secure Keyed-Homomorphic Public-Key Encryption", Public Key Cryptography 2013: 32-50, May 13, 2014, pp. 1-46.

International Search Report for PCT/JP2016/051245 (PCT/ISA/210) dated Mar. 22, 2016.

Lai et al., "Efficient CCA-Secure PKE from Identity-Based Techniques", LNCS, Topics in Cryptology—CT-RSA 2010, vol. 5985, pp. 132-147.

Libert et al., "Unidirectional Chosen-Ciphertext Secure Proxy Re-Encryption", IEEE Transactions on Information Theory, vol. 57, No. 3, Mar. 2011, pp. 1786-1802.

U.S. Appl. No. 16/327,107, filed Feb. 21, 2019.

Office Action issued in corresponding Indian Application No. 201847024570 dated Jun. 22, 2020.

* cited by examiner

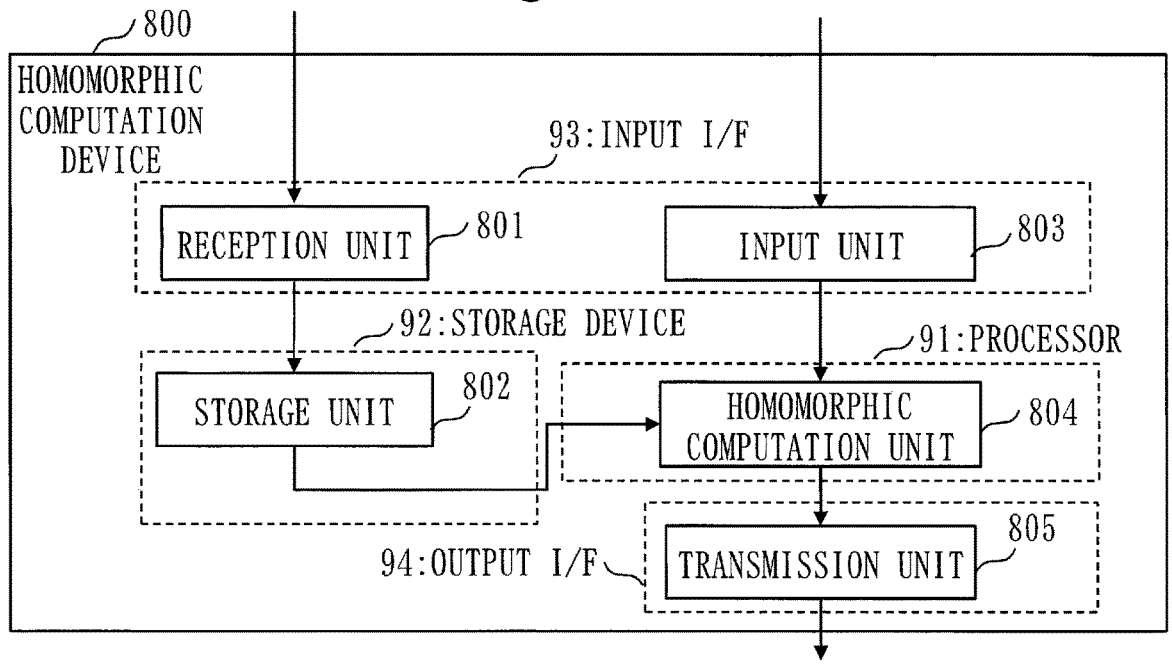
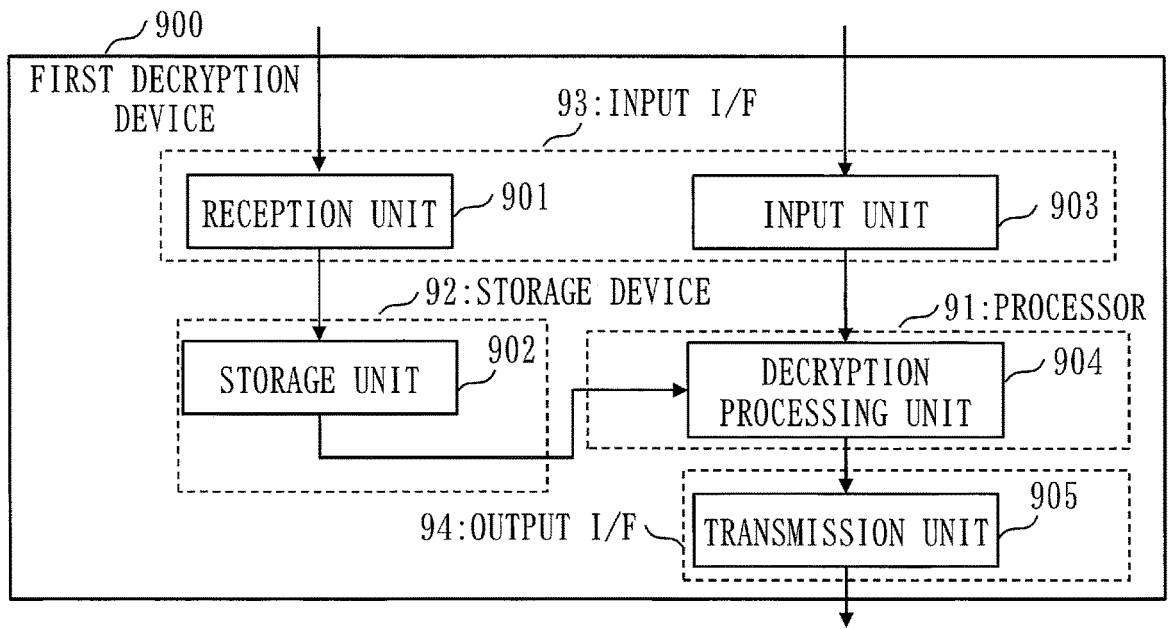

ENCRYPTED TEXT CONVERSION DEVICE, COMPUTER READABLE MEDIUM, AND ENCRYPTION TEXT CONVERSION METHOD

TECHNICAL FIELD

The present invention relates to homomorphic encryption. The invention relates to an encryption device, an encrypted text conversion device, an encryption program, an encrypted text conversion program, an encryption method, and an encrypted text conversion method, each of which uses homomorphic encryption.

BACKGROUND ART

When data is encrypted, it is normally impossible to read and edit data inside unless the data is decrypted. Therefore, in order to edit data in a plurality of encrypted texts, it is necessary to decrypt the plurality of encrypted texts once, extract plain texts as data, then edit the plain texts, and encrypt the plain texts again. On the contrary, in homomorphic encryption, it is possible to edit data in an encrypted text without decrypting the encrypted text. Processing at that time is referred to as "homomorphic computation", and a type that can be subjected to homomorphic computation and the number of times of homomorphic computation are changed depending on a specific method.

As homomorphic encryption, there are proposed homomorphic encryption in which only addition or multiplication can be performed, such as ElGamal encryption and Pailier encryption, and Gentry encryption or the like in which addition and multiplication can be executed without limitation. In those methods, as a first point, encrypted texts need to be generated by using the same public key when homomorphic computation is performed. As a second point, an encrypted text that has not been subjected to homomorphic computation yet is computed while being encrypted, and therefore it is problematic in that, even in a case where a plain text is changed by homomorphic computation, such a change cannot be detected.

Some methods for solving such a problem are proposed (see, for example, Patent Literature 1 and Non-Patent Literature 1).

CITATION LIST

Patent Literature

Patent Literature 1: WO2014/010202 A1

Non-Patent Literature

Non-Patent Literature 1: Keita Emura, Goichiro Hanaoka, Go Ohtake, Takahiro Matsuda, Shota Yamada: Chosen Ciphertext Secure Keyed-Homomorphic Public-Key Encryption. Public Key Cryptography 2013: 32-50

SUMMARY OF INVENTION

Technical Problem

In a method disclosed in Patent Literature 1, encrypted texts generated by using a plurality of different keys are changed to encrypted texts having a single specified key by a technology referred to as "proxy re-encryption" and are subjected to homomorphic computation.

However, in this method, safety of encrypted texts that have not been subjected to homomorphic computation yet is low, and therefore it is problematic in that plain text data is changeable.

In another method disclosed in Non-Patent Literature 1, although a special key is needed to perform homomorphic computation, strength of safety of encrypted texts that have not been subjected to homomorphic computation yet is improved. Specifically, falsification of plain text data is prevented.

However, this method is problematic in that a user who can decrypt encrypted texts that have been subjected to homomorphic computation can also decrypt encrypted texts that have not been subjected to homomorphic computation yet.

As described above, in Patent Literature 1 and Non-Patent Literature 1, content of a plain text of an encrypted text that has not been subjected to homomorphic computation yet may be changed.

In view of this, an object of the invention is to provide a device, a program, and a method for detecting a change in an encrypted text that has not been subjected to homomorphic computation yet.

Solution to Problem

An encryption device according to the present invention includes:

an encryption unit to encrypt a plain text M by using one of a pair of keys to generate an encrypted text D into which the plain text M is encrypted and which can be subjected to homomorphic computation;

a detection element generation unit to generate a detection element E used to detect a change in the encrypted text D by using the one key and the encrypted text D; and an output unit to output the encrypted text D and the detection element E.

Advantageous Effects of Invention

The invention employs a detection element for detecting a change in an encrypted text in a homomorphic encryption technology capable of computing data while the data is being encrypted and can therefore detect a change in an encrypted text that has not been subjected to homomorphic computation yet. This makes it possible to achieve the use of safe homomorphic computation using an unchanged genuine encrypted text.

BRIEF DESCRIPTION OF DRAWINGS

FIG. 8 is a diagram of Embodiment 1 and is a block diagram of a homomorphic computation device.

FIG. 9 is a diagram of Embodiment 1 and is a block diagram of a first decryption device.

FIG. 21 is a diagram of Embodiment 1 and is a diagram illustrating a hardware configuration of the common parameter generation device and the like.

FIG. 22 is a diagram of Embodiment 1 and is another diagram illustrating a hardware configuration of the common parameter generation device and the like.

DESCRIPTION OF EMBODIMENTS

Embodiment 1

Hereinafter, a key generation device 300 and the like are referred to as follows.
(1) Embodiment 1 discloses a key generation device 300 for generating a pair of a public key pk and a decryption key sk (secret key). This key generation device 300 is referred to as "first key generation device 300".
(2) The public key pk and the decryption key sk generated by the first key generation device 300 are referred to as "first public key pk" and "first decryption key sk". Note that those keys are also referred to as "public key pk" and "decryption key sk".
(3) Embodiment 1 discloses a post-homomorphic-computation key generation device 400 for generating a pair of a public key epk and a decryption key esk (secret key). This post-homomorphic-computation key generation device 400 is referred to as "second key generation device".
(4) The public key epk and the decryption key esk generated by the second key generation device are referred to as "second public key epk" and "second decryption key esk". Note that those keys are also referred to as "public key epk" and "decryption key esk".
(5) Embodiment 1 discloses a decryption device 900 for decrypting an encrypted text by using the first decryption key sk. This decryption device 900 is referred to as "first decryption device".
(6) Embodiment 1 discloses a decryption device 1000 for decrypting an encrypted text that has been subjected to homomorphic computation by using the second decryption key esk. This decryption device 1000 is referred to as "second decryption device".

Figure 1:
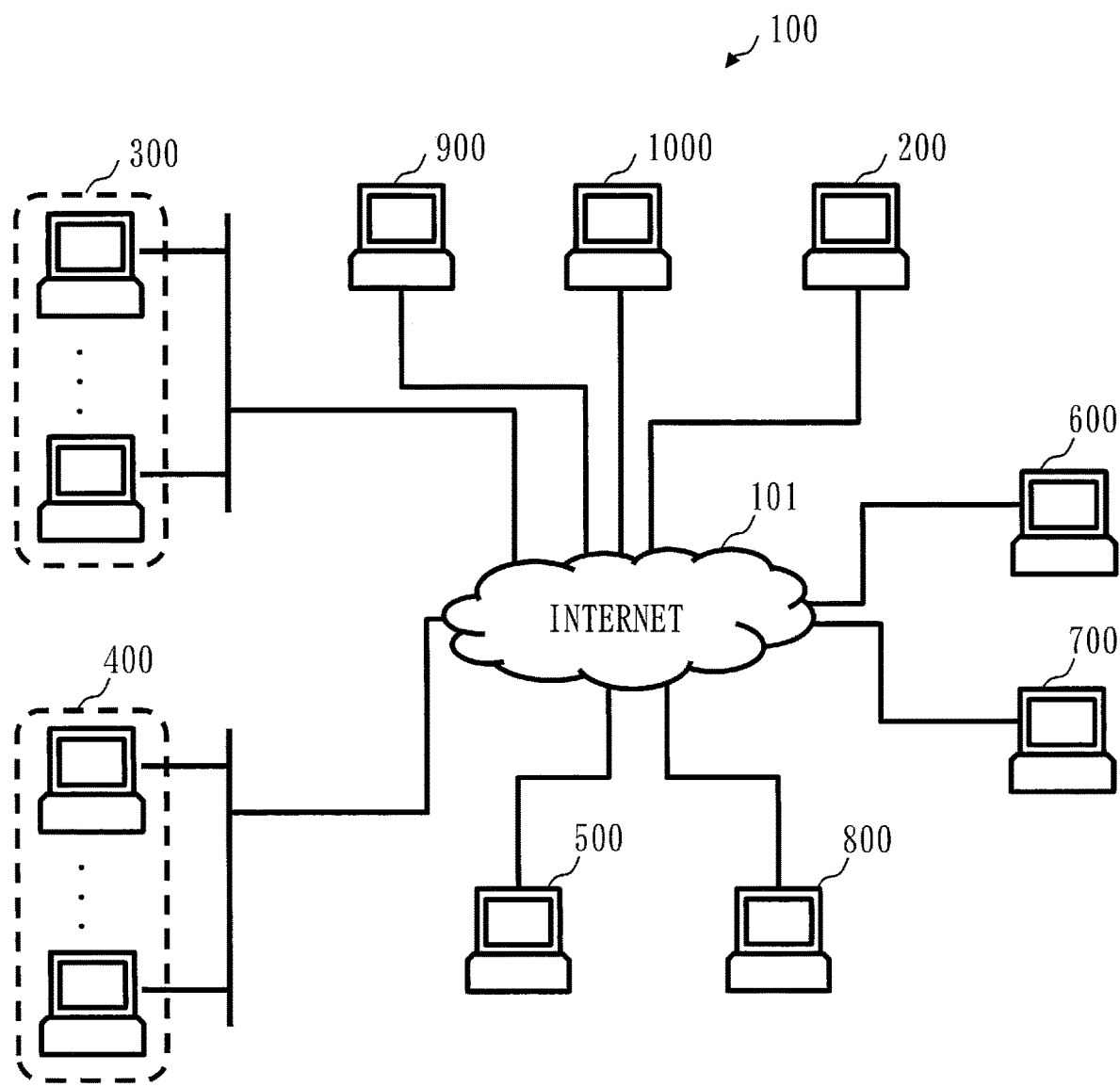
FIG. 1 is a diagram of Embodiment 1 and is a block diagram illustrating a configuration of a confidential analysis system.

FIG. 1 is a block diagram illustrating a configuration of a confidential analysis system 100. As illustrated in FIG. 1, the confidential analysis system 100 includes a common parameter generation device 200, a plurality of first key generation devices 300, a plurality of second key generation devices 400, an encryption device 500, a conversion key generation device 600, an encrypted text conversion device 700, a homomorphic computation device 800, the first decryption device 900, and the second decryption device 1000.

The confidential analysis system 100 may be achieved in such a way that the common parameter generation device 200 to the second decryption device 1000 are connected not via Internet 101 but via a local area network (LAN) provided in the same company.

The Internet 101 is a communication channel for connecting the common parameter generation device 200, the plurality of first key generation devices 300, the plurality of second key generation devices 400, the encryption device 500, the conversion key generation device 600, the encrypted text conversion device 700, the homomorphic computation device 800, the first decryption device 900, and the second decryption device 1000. The Internet 101 is an example of a network. Another type of network may be used instead of the Internet 101.

The common parameter generation device 200 generates a common parameter pub that is a common parameter to be used in the system and transmits the common parameter pub to the plurality of first key generation devices 300, the plurality of second key generation devices 400, the encryption device 500, the conversion key generation device 600, the encrypted text conversion device 700, the homomorphic computation device 800, the first decryption device 900, and the second decryption device 1000 via the Internet 101. Note that this common parameter pub may be provided via a mail, a bulletin board on a website, or the like instead of the Internet 101.

Note that it is assumed that, in a case where acquisition of the common parameter pub is not described in the following description of the encryption device 500 and the like, the common parameter pub has already been acquired.

Each first key generation device 300 may be a personal computer. The first key generation device 300 is a computer that generates the public key pk and the decryption key sk, transmits the public key pk to the encryption device 500, the encrypted text conversion device 700, and the first decryption device 900, and transmits the decryption key sk to the conversion key generation device 600 and the first decryption device 900.

Each second key generation device 400 may be a personal computer. The second key generation device 400 is a computer that generates the second public key epk and the second decryption key esk, transmits the second public key epk to the conversion key generation device 600 and the homomorphic computation device 800, and transmits the second decryption key esk to the second decryption device 1000.

The encryption device 500 functions as an encryption device of data and may be a personal computer. The encryption device 500 is a computer that receives the public key pk from the first key generation device 300, accepts input of a plain text M from the outside, and outputs an encrypted text C.

The conversion key generation device 600 may be a personal computer. The conversion key generation device 600 is a computer that receives the decryption key sk from the first key generation device 300 and the second public key epk from the second key generation device 400, generates a conversion key rk, and transmits the conversion key rk to the encrypted text conversion device 700.

The encrypted text conversion device 700 may be a personal computer. The encrypted text conversion device 700 is a computer that receives the conversion key rk from the conversion key generation device 600, accepts input of the encrypted text C, acquires the public key pk, generates a converted encrypted-text RC into which the encrypted text C is converted, and outputs the converted encrypted-text RC.

The homomorphic computation device 800 may be a personal computer. The homomorphic computation device 800 is a computer that receives the second public key epk from the second key generation device 400, accepts input of a plurality of converted encrypted-texts RC, and outputs encrypted texts EC (hereinafter, encrypted texts EC) that have been subjected to homomorphic computation.

The first decryption device 900 may be a personal computer. The first decryption device 900 is a computer that receives the decryption key sk from the first key generation device 300, acquires the public key pk, accepts input of the encrypted text C, and outputs a decryption result of the encrypted text C.

The second decryption device 1000 may be a personal computer. The second decryption device 1000 is a computer that receives the second decryption key esk from the second key generation device 400, accepts input of the encrypted texts EC, and outputs a decryption result of the encrypted texts EC.

Note that two or more of the first key generation device 300, the decryption device 900, and the conversion key generation device 600 may be simultaneously included in the same personal computer.

Note that the second key generation device 400 and the second decryption device 1000 may be simultaneously included in the same personal computer.

Note that two or more of the conversion key generation device 600, the encrypted text conversion device 700, and the homomorphic computation device 800 may be simultaneously included in the same personal computer.

<*Description of Configuration*>

Hereinafter, a configuration of this embodiment will be described.

As illustrated in FIG. 1, the confidential analysis system 100 includes the common parameter generation device 200, the plurality of first key generation devices 300, the plurality of second key generation devices 400, the encryption device 500, the conversion key generation device 600, the encrypted text conversion device 700, the homomorphic computation device 800, the first decryption device 900, and the second decryption device 1000.

FIG. 2 to FIG. 10 are block diagrams illustrating configurations of the common parameter generation device 200, the first key generation device 300, the second key generation device 400, the encryption device 500, the conversion key generation device 600, the encrypted text conversion device 700, the homomorphic computation device 800, the first decryption device 900, and the second decryption device 1000, each of which is a computer.

Figure 21:
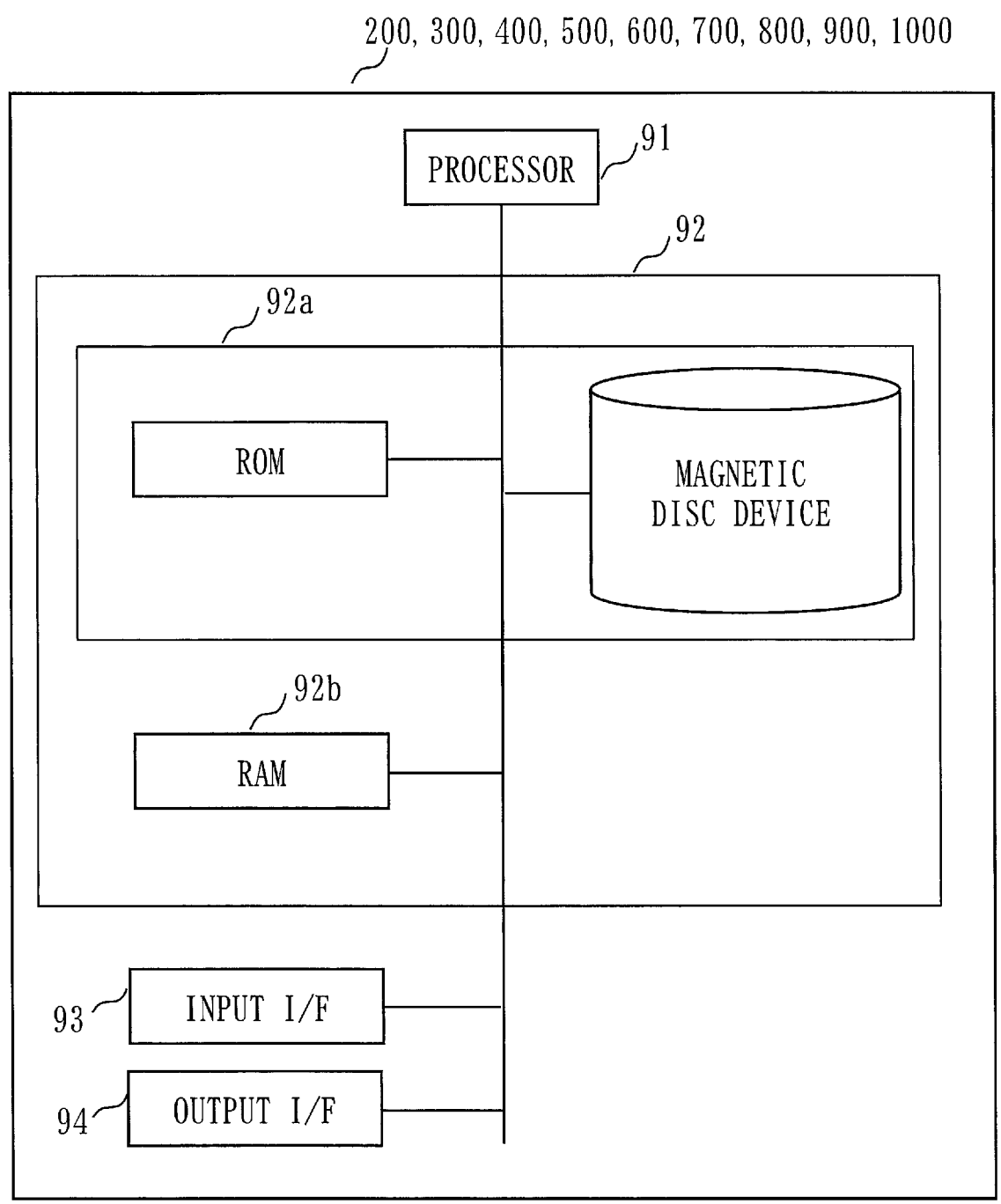

FIG. 21 is a diagram illustrating a hardware configuration of the common parameter generation device 200 to the second decryption device 1000.

In this embodiment, the common parameter generation device 200, the first key generation devices 300, the second key generation devices 400, the encryption device 500, the conversion key generation device 600, the encrypted text conversion device 700, the homomorphic computation device 800, the first decryption device 900, and the second decryption device 1000 are computers.

The common parameter generation device 200, the first key generation devices 300, and the second key generation devices 400 include hardware such as a processor 91, an input interface 93, and an output interface 94. The encryption device 500 to the second decryption device 1000 include hardware such as the processor 91, a storage device 92, the input interface 93, and the output interface 94. Hereinafter, the input interface 93 and the output interface 94 are referred to as "input I/F 93" and "output I/F 94".

FIG. 2 to FIG. 10 illustrate a relationship between each function unit and hardware. In FIG. 2 to FIG. 10, the " . . . unit" serving as the processor 91 is achieved by software. In other words, the " . . . unit" serving as the processor 91 is achieved by the processor 91 executing software. Further, the "storage unit" in FIG. 5 to FIG. 10 is achieved by the storage device 92.

The processor 91 is connected to other pieces of hardware via a signal line and controls those other pieces of hardware. The processor 91 is an integrated circuit (IC) for performing processing. The processor 91 is specifically a central processing unit (CPU).

The storage device 92 includes an auxiliary storage device 92a and a memory 92b. The auxiliary storage device 92a is specifically a read only memory (ROM), a flash memory, or a hard disk drive (HDD). The memory 92b is specifically a random access memory (RAM).

The input I/F 93 is a port through which signals are input. Further, the input I/F 93 may be a port to be connected to an input device such as a mouse, a keyboard, and a touchscreen. The input I/F 93 is specifically a universal serial bus (USB) terminal. Note that the input interface 93 may be a port to be connected to a local area network (LAN).

The output I/F 94 is a port through which signals are output. The output OF 94 may be a USB terminal.

The auxiliary storage device 92a stores a program that achieves a function of the " . . . unit" serving as the processor 91. This program is loaded into the memory 92b, is read by the processor 91, and is executed by the processor 91. The auxiliary storage device 92a also stores an operating system (OS). At least part of the OS is loaded into the memory 92b, and the processor 91 executes the program that achieves the function of the "unit" serving as the processor 91 while executing the OS.

The common parameter generation device 200 to the second decryption device 1000 may include only a single processor 91 or may include a plurality of processors 91. The plurality of processors 91 may cooperatively execute the program that achieves the function of the "unit".

Information indicating a result of processing by the function of the "unit" serving as the processor 91, data, signal values, and variable values are stored on the auxiliary storage device 92a, the memory 92b, or a register or cache memory in the processor 91.

The program that achieves the function of the "unit" serving as the processor 91 may be stored on portable record media such as a magnetic disc, a flexible disk, an optical disc, a compact disk, and a digital versatile disc (DVD).

Figure 2:
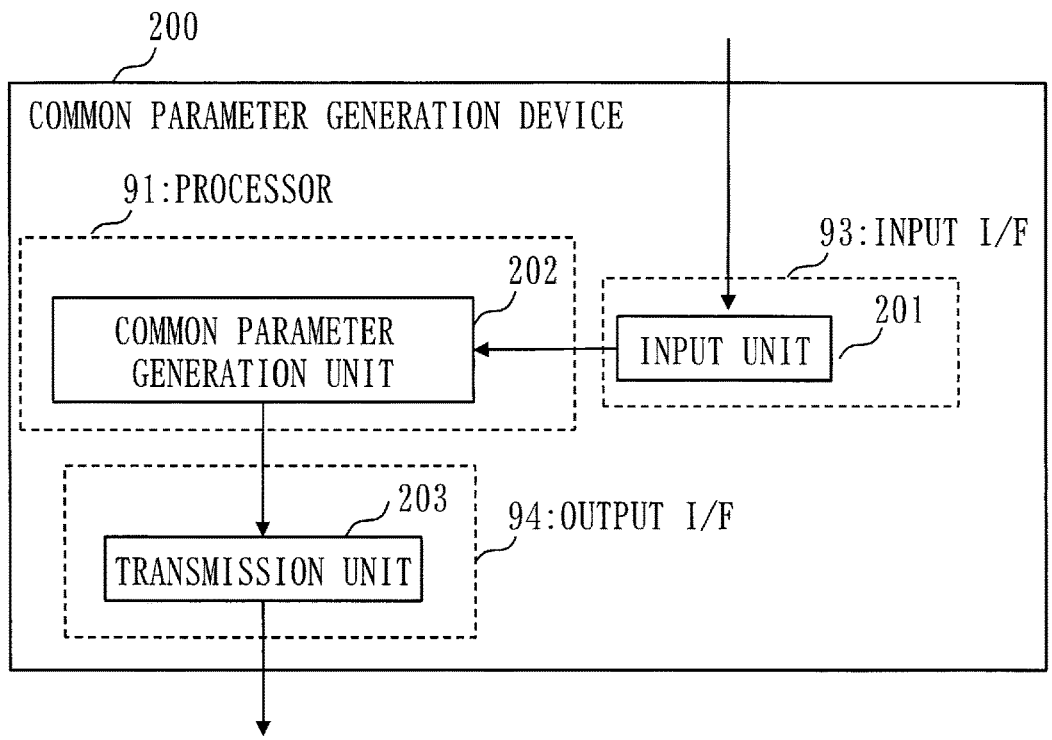
FIG. 2 is a diagram of Embodiment 1 and is a block diagram of a common parameter generation device.

FIG. 2 is a block diagram illustrating a configuration of the common parameter generation device 200. As illustrated in FIG. 2, the common parameter generation device 200 includes an input unit 201, a common parameter generation unit 202, and a transmission unit 203. Although not illustrated, the common parameter generation device 200 includes a recording medium storing data to be used in each unit of the common parameter generation device 200. The input unit 201 accepts input of a bit length $L_{bit}$ of a key to be used in this system. Next, the common parameter generation unit 202 generates the common parameter pub that is a basic part of computation used in this system. Although not illustrated, the common parameter generation unit 202 may have a function of generating random sampling numbers in order to generate the common parameter pub. The transmission unit 203 transmits the common parameter pub generated in the common parameter generation unit 202 to the plurality of first key generation devices 300, the plurality of second key generation devices 400, the encryption device 500, the conversion key generation device 600, the encrypted text conversion device 700, the homomorphic computation device 800, the first decryption device 900, and the second decryption device 1000.

Figure 3:
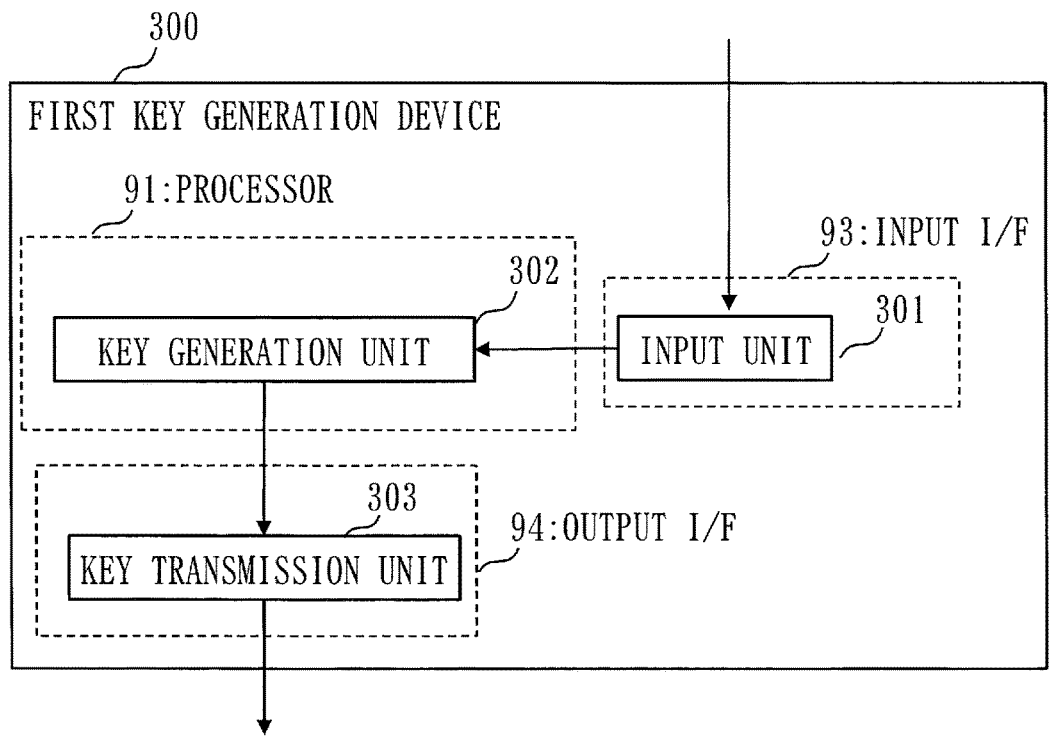
FIG. 3 is a diagram of Embodiment 1 and is a block diagram of a first key generation device.

FIG. 3 is a block diagram illustrating a configuration of the first key generation device 300. As illustrated in FIG. 3, the first key generation device 300 includes an input unit 301, a key generation unit 302, and a key transmission unit 303. Although not illustrated, the first key generation device 300 includes a recording medium storing data to be used in each unit of the first key generation device 300. The input unit 301 accepts input of the common parameter pub. Next, the key generation unit 302 generates the pair of the first public key pk and the first decryption key sk. Although not illustrated, the key generation unit 302 may have a function of generating random sampling numbers in order to generate pk and sk. The key transmission unit 303 transmits the first public key pk generated in the key generation unit 302 to the encryption device 500, the encrypted text conversion device 700, and the first decryption device 900 and transmits the generated first decryption key sk to the conversion key generation device 600 and the first decryption device 900.

Figure 4:
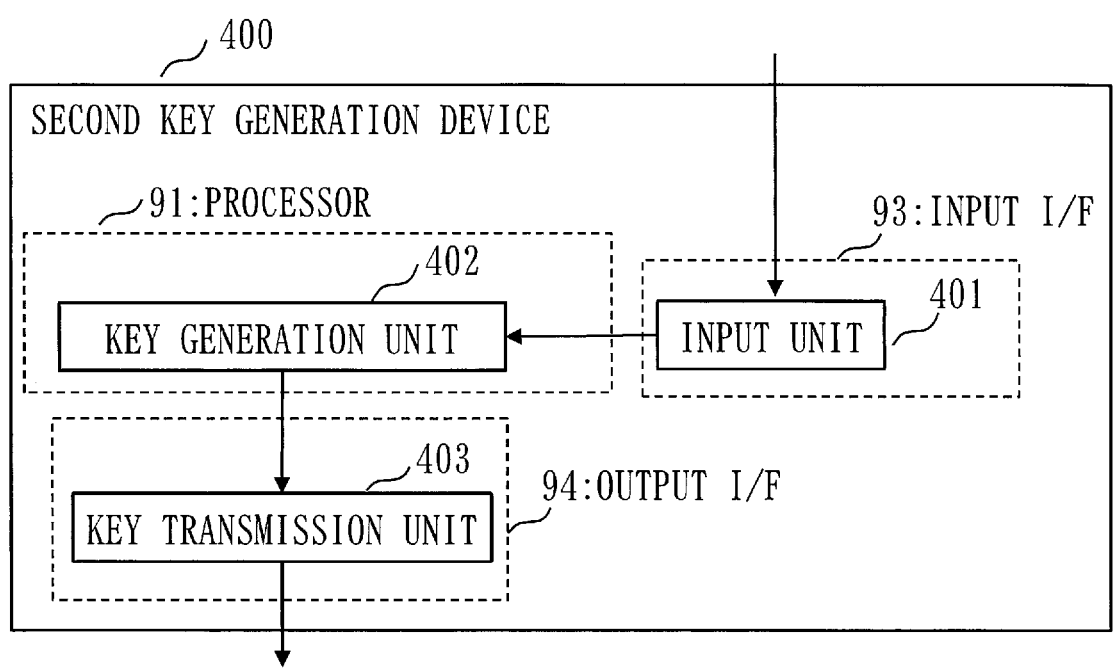
FIG. 4 is a diagram of Embodiment 1 and is a block diagram of a second key generation device.

FIG. 4 is a block diagram illustrating a configuration of the second key generation device 400. As illustrated in FIG. 4, the second key generation device 400 includes an input unit 401, a key generation unit 402, and a key transmission unit 403. Although not illustrated, the second key generation device 400 includes a recording medium storing data to be used in each unit of the second key generation device 400. The input unit 401 accepts input of the common parameter pub. The key generation unit 402 generates the pair of the second public key epk and the second decryption key esk. Although not illustrated, the key generation unit 402 may have a function of generating random sampling numbers in order to generate the second public key epk and the second decryption key esk. The key transmission unit 403 transmits the second public key epk generated in the key generation unit 402 to the conversion key generation device 600 and the homomorphic computation device 800 and transmits the generated second decryption key esk to the second encrypted text decryption device 1000.

Figure 5:
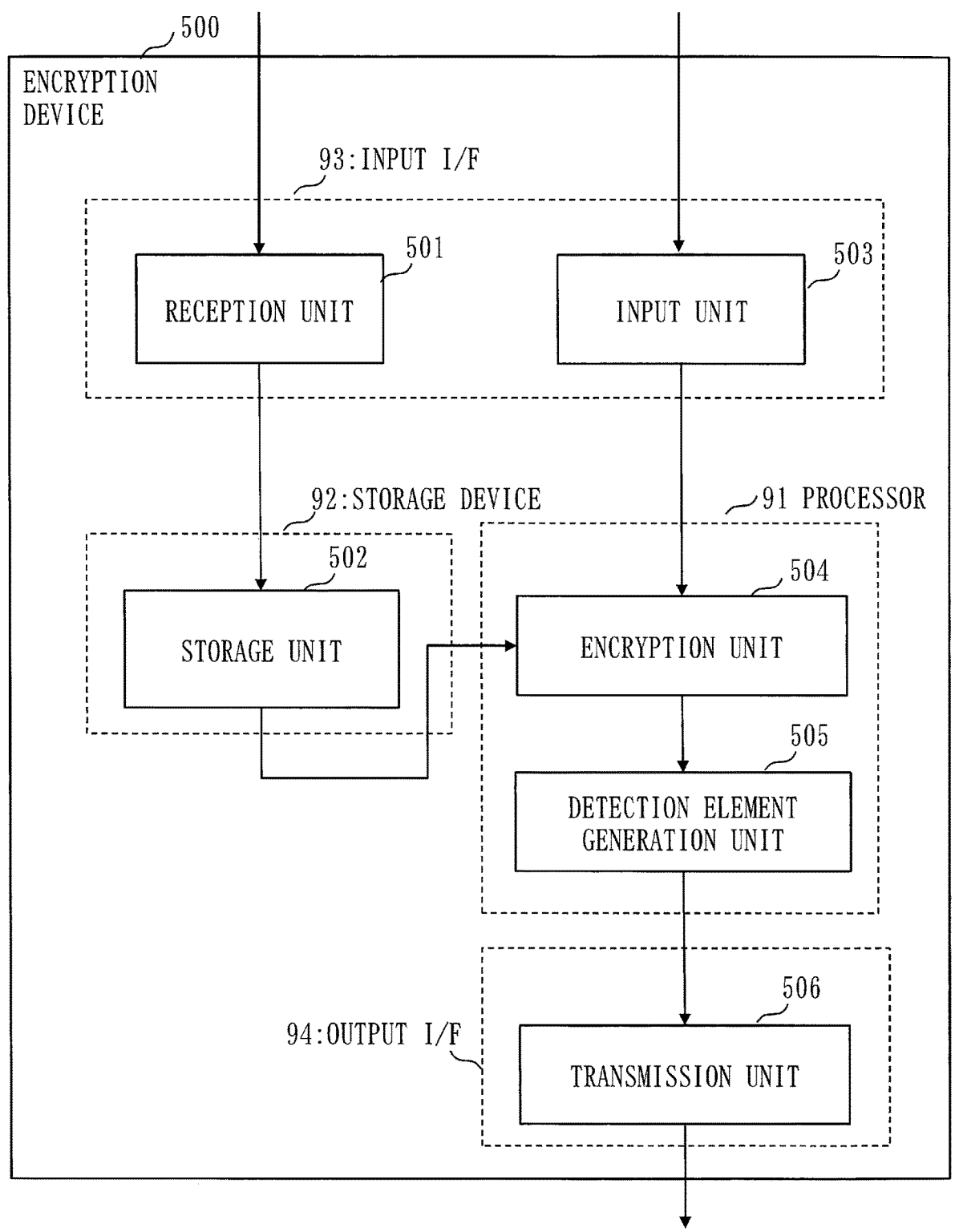
FIG. 5 is a diagram of Embodiment 1 and is a block diagram of an encryption device.

FIG. 5 is a block diagram illustrating a configuration of the encryption device 500. As illustrated in FIG. 5, the encryption device 500 includes a reception unit 501, a storage unit 502, an input unit 503, an encryption unit 504, a detection element generation unit 505, and a transmission unit 506. Although not illustrated, the encryption device 500 includes a recording medium storing data to be used in each unit of the encryption device 500. The reception unit 501 accepts input of the first public key pk. The storage unit 502 stores the first public key pk. The input unit 503 accepts input of the plain text M from the outside. The encryption unit 504 generates an encrypted text D on the basis of the first public key pk stored on the storage unit 502 and the plain text M input to the input unit 503. Although not illustrated, the encryption unit 504 may have a function of generating random sampling numbers in order to generate the encrypted text D. The detection element generation unit 505 generates a detection element E on the basis of the encrypted text D and the first public key pk. Although not illustrated, the detection element generation unit 505 may have a function of generating random sampling numbers in order to generate the detection element E. The transmission unit 506 outputs the encrypted text C=(D, E). In other words, the transmission unit 506 outputs a pair of the encrypted text D and the detection element E as the encrypted text C.

Figure 6:
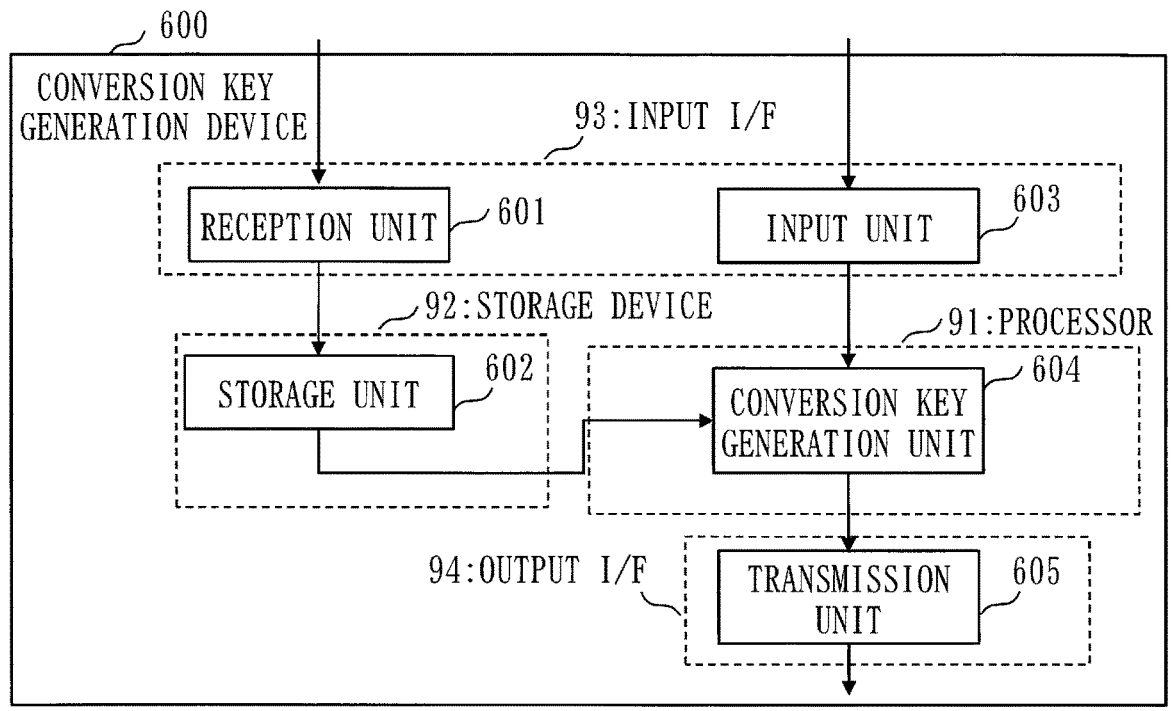
FIG. 6 is a diagram of Embodiment 1 and is a block diagram of a conversion key generation device.

FIG. 6 is a block diagram illustrating a configuration of the conversion key generation device 600. As illustrated in FIG. 6, the conversion key generation device 600 includes a reception unit 601, a storage unit 602, an input unit 603, a conversion key generation unit 604, and a transmission unit 605. Although not illustrated, the conversion key generation device 600 includes a recording medium storing data to be used in each unit of the conversion key generation device 600. The reception unit 601 receives the decryption key sk. Next, the storage unit 602 stores the decryption key sk. The input unit 603 accepts input of the second public key epk. The conversion key generation unit 604 generates the conversion key rk on the basis of the first decryption key sk stored on the storage unit 602 and the second public key epk input to the input unit 603.

In other words, rk=RKG (epk, sk) is satisfied.

The symbol "RKG" is a computation symbol showing generation of the conversion key rk. Although not illustrated, the conversion key generation unit 604 may have a function of generating random sampling numbers in order to generate the conversion key rk. The transmission unit 605 transmits the conversion key rk to the encrypted text conversion device 700.

Figure 7:
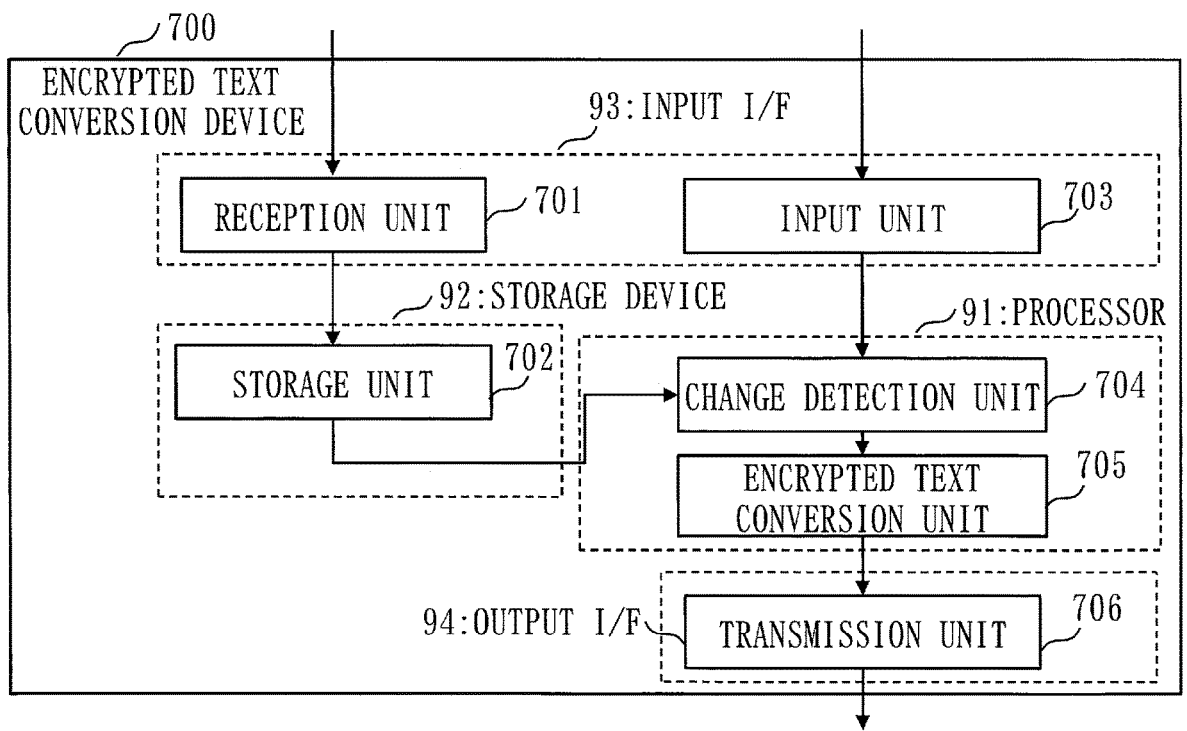
FIG. 7 is a diagram of Embodiment 1 and is a block diagram of an encrypted text conversion device.

FIG. 7 is a block diagram illustrating a configuration of the encrypted text conversion device 700. As illustrated in FIG. 7, the encrypted text conversion device 700 includes a reception unit 701, a storage unit 702, an input unit 703, a change detection unit 704, an encrypted text conversion unit 705, and a transmission unit 706. Although not illustrated, the encrypted text conversion device 700 includes a recording medium storing data to be used in each unit of the encrypted text conversion device 700.

The reception unit 701 receives the conversion key rk. The storage unit 702 stores the conversion key rk. The input unit 703 accepts input of the encrypted text C=(D, E) and the first public key pk. The change detection unit 704 verifies, by using the first public key pk, whether or not the plain text M of the encrypted text C input to the input unit 703 has been changed. The encrypted text conversion unit 705 generates the converted encrypted-text RC on the basis of the conversion key rk stored on the storage unit 702 and the encrypted text C input to the input unit 703. In a case where the change detection unit 704 detects a change, the encrypted text conversion unit 705 substitutes a special symbol indicating the change for the converted encrypted-text RC as the converted encrypted-text RC. In a case where the change detection unit 704 does not detect the change, the encrypted text conversion unit 705 generates the converted encrypted-text RC. Although not illustrated, the encrypted text conversion unit 705 may have a function of generating random sampling numbers in order to generate the converted encrypted-text RC. The transmission unit 706 outputs the converted encrypted-text RC.

FIG. 8 is a block diagram illustrating a configuration of the homomorphic computation device 800. As illustrated in FIG. 8, the homomorphic computation device 800 includes a reception unit 801, a storage unit 802, an input unit 803, a homomorphic computation unit 804, and a transmission unit 805. Although not illustrated, the homomorphic computation device 800 includes a recording medium storing data to be used in each unit of the homomorphic computation device 800. The reception unit 801 receives the converted encrypted-text RC. The storage unit 802 stores a plurality of converted encrypted-texts RC received by the reception unit 801. The input unit 803 accepts input of the second public key epk. The homomorphic computation unit 804 generates the encrypted texts EC on the basis of all the converted encrypted-texts RC stored on the storage unit 802 and the second public key epk input to the input unit 803. Although not illustrated, the homomorphic computation unit 804 may have a function of generating random sampling numbers and the like in order to generate the encrypted texts EC. The transmission unit 805 outputs the encrypted texts EC.

FIG. 9 is a block diagram illustrating a configuration of the first decryption device 900. As illustrated in FIG. 9, the first decryption device 900 includes a reception unit 901, a storage unit 902, an input unit 903, a decryption processing unit 904, and a transmission unit 905. Although not illustrated, the first decryption device 900 includes a recording medium storing data to be used in each unit of the first decryption device 900. The reception unit 901 accepts input of the decryption key sk. The storage unit 902 stores the decryption key sk received by the reception unit 901. The input unit 903 accepts input of the encrypted text C (D, E) and the public key pk. The decryption processing unit 904 generates the decryption result M of the encrypted text C on the basis of the decryption key sk stored on the storage unit 902 and the encrypted text C input to the input unit 903. The transmission unit 905 outputs the decryption result M.

Figure 10:
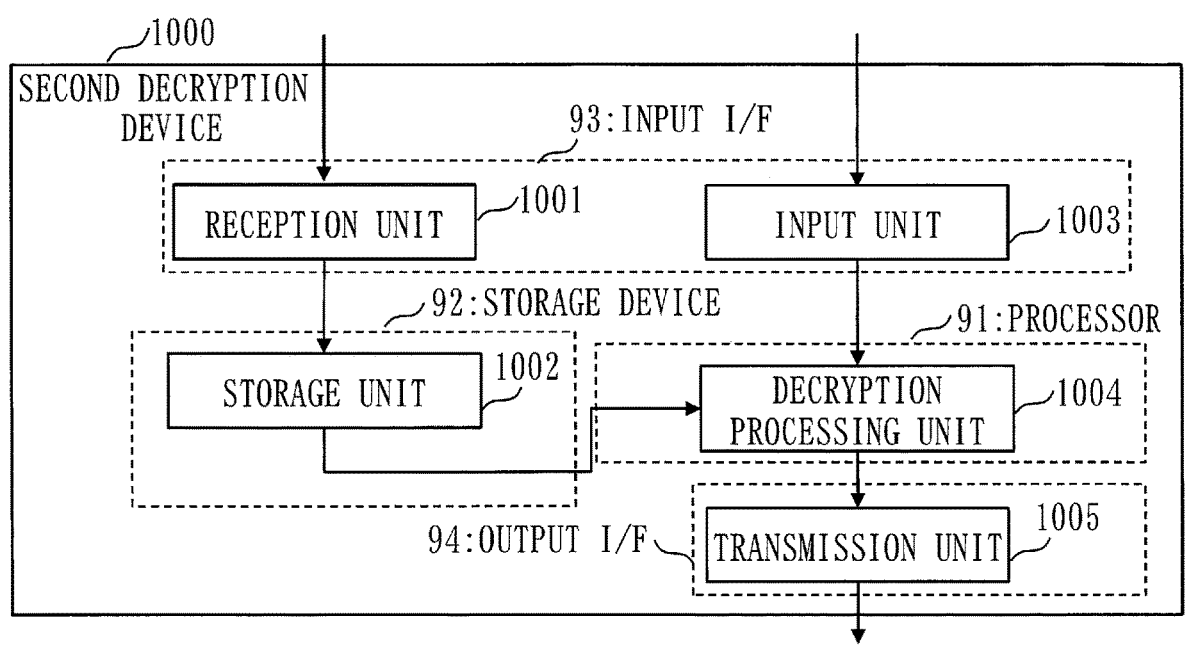
FIG. 10 is a diagram of Embodiment 1 and is a block diagram illustrating a second decryption device.

FIG. 10 is a block diagram illustrating a configuration of the second decryption device 1000. As illustrated in FIG. 10, the second decryption device 1000 includes a reception unit 1001, a storage unit 1002, an input unit 1003, a decryption processing unit 1004, and a transmission unit 1005. Although not illustrated, the second decryption device 1000 includes a recording medium storing data to be used in each unit of the second decryption device 1000. The reception unit 1001 accepts input of the second decryption key esk. The storage unit 1002 stores the second decryption key esk received by the reception unit 1001. The input unit 1003 accepts input of the encrypted texts EC. The decryption processing unit 1004 generates a decryption result EM of the encrypted texts EC on the basis of the second decryption key esk stored on the storage unit 1002 and the encrypted texts EC input to the input unit 1003. The transmission unit 1005 outputs the decryption result EM.

Hereinafter, operation of each device corresponding to a calculation method in each device of this embodiment will be described.

Figure 20:
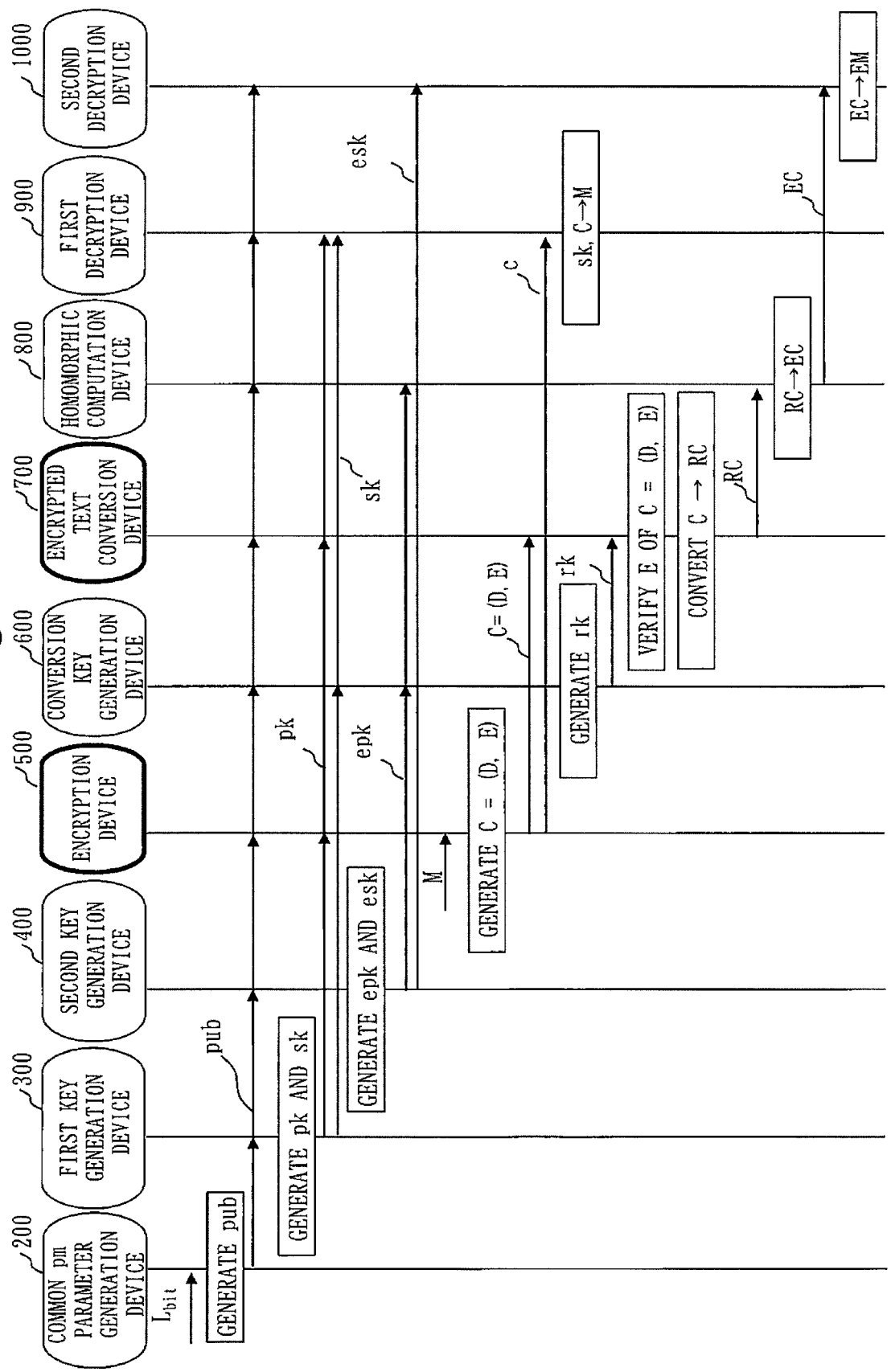
FIG. 20 is a diagram of Embodiment 1 and illustrates input and output of data in the confidential analysis system.

Description will be provided also with reference to FIG. 20. FIG. 20 illustrates input and output of data in the confidential analysis system 100.

Figure 11:
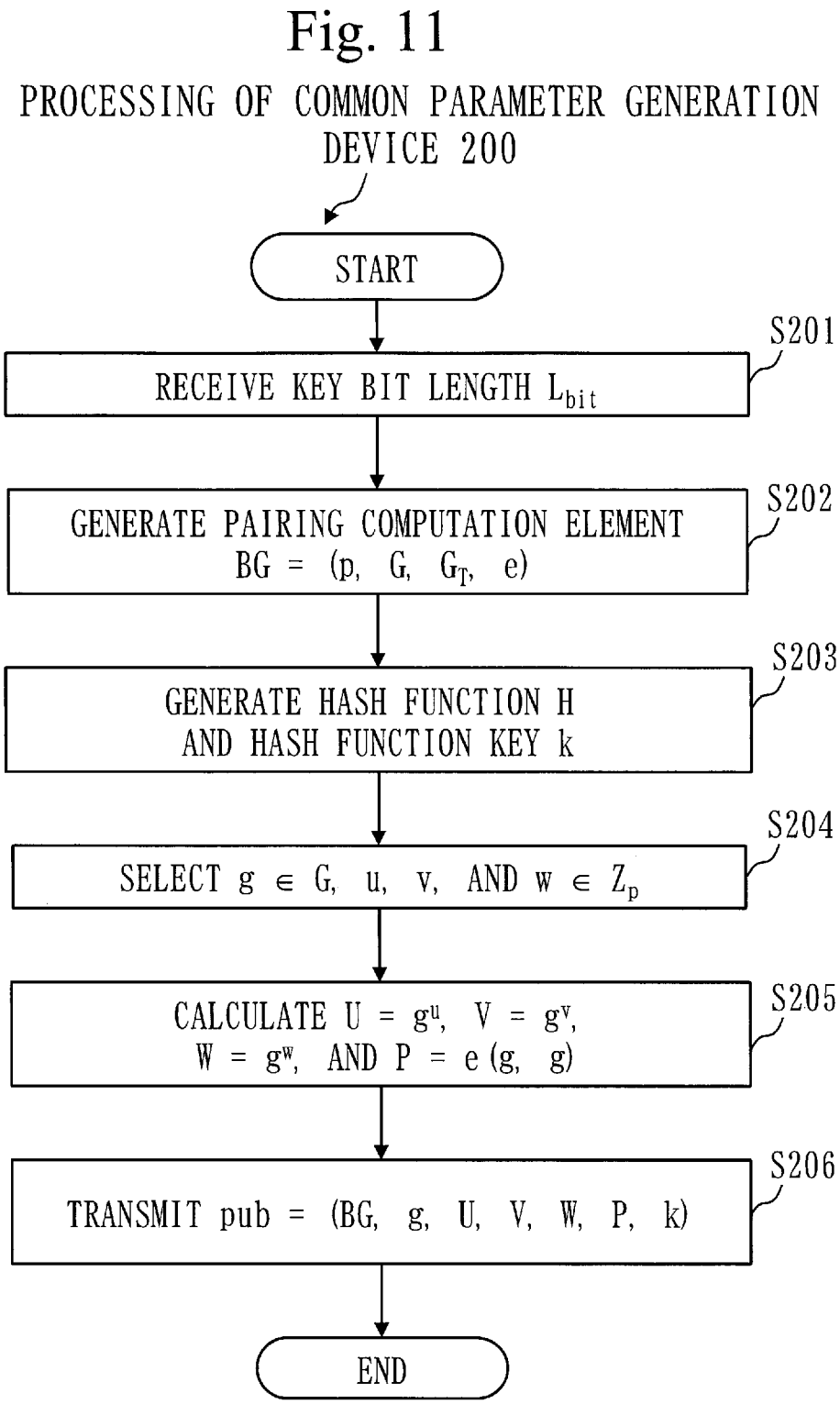
FIG. 11 is a diagram of Embodiment 1 and is a flowchart illustrating processing of the common parameter generation device.

FIG. 11 is a flowchart illustrating operation of the common parameter generation device 200. As illustrated in FIG. 20, the common parameter generation device 200 receives the bit length $L_{bit}$ of a key, generates the common parameter pub, and outputs the common parameter pub.

In Step S201, the input unit 201 receives the bit length $L_{bit}$ of the key.

In Step S202, based on the bit length $L_{bit}$ of the key, the common parameter generation unit 202 generates an element BG=(p, G, $G_T$, e) that can be subjected to pairing computation.

Herein, the symbol "p" denotes order of a group G and a group $G_T$.

The symbol "e" is a bilinear mapping having a mapping of G×G→$G_T$. The bilinear mapping is a mapping in which $e(g^a, g^b)=e(g, g)^{ab} \in G_T$ is satisfied for all g∈G, and a, b∈$Z_p$. This computation using e is referred to as "pairing computation". Note that $Z_p$ is an aggregation of integers of mod=p.

In Step S203, the common parameter generation unit 202 generates a hash function H and a hash function key k.

In Step S204, the common parameter generation unit 202 selects g from the group G at random and selects u, v, and w∈$Z_p$ at random.

In Step S205, the common parameter generation unit 202 calculates $$U=g^u, V=g^v, W=g^w, \text{ and } P=e(g,g)$$

and generates the common parameter pub=(BG, g, U, V, W, P, k).

In Step S206, the transmission unit 203 outputs the common parameter pub. Note that the transmission unit 203 is an output unit, and is assumed to perform transmission via the Internet 101 as illustrated in FIG. 1. However, the transmission unit 203 may be included therein and output the common parameter pub to a built-in storage medium or may output the common parameter pub to an attached storage medium. The same applies to all the transmission units described below.

Figure 12:
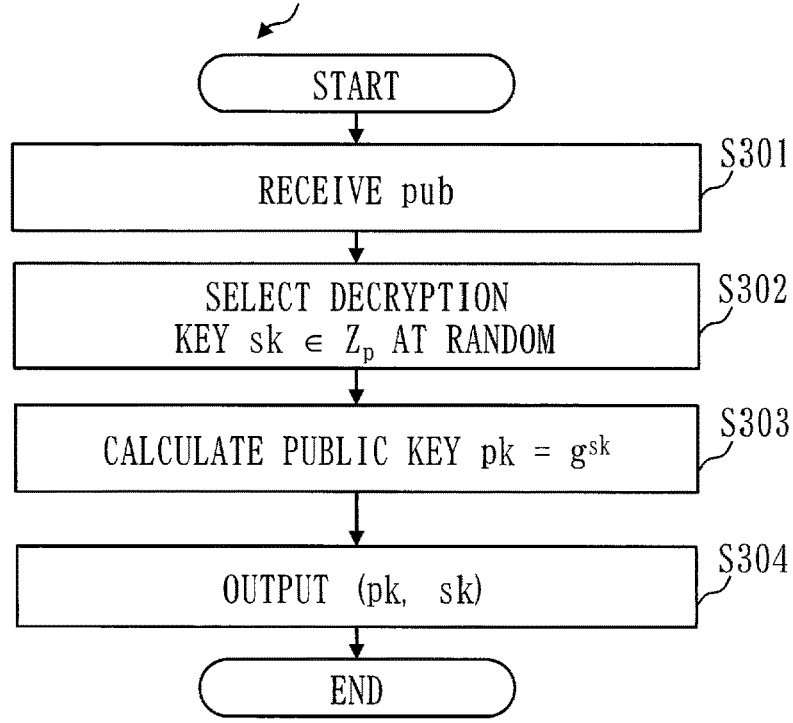
FIG. 12 is a diagram of Embodiment 1 and is a flowchart illustrating processing of the first key generation device.

FIG. 12 is a flowchart illustrating operation of the first key generation device 300. As illustrated in FIG. 20, the first key generation device 300 receives the common parameter pub, generates the first public key pk and the first decryption key sk by using the common parameter pub, and outputs the first public key pk and the first decryption key sk.

In Step S301, the input unit 301 receives the common parameter pub.

In Step S302, the key generation unit 302 selects a decryption key sk∈$Z_p$ at random.

In Step S303, the key generation unit 302 calculates a public key pk=$g^{sk}$.

In Step S304, the key transmission unit 303 transmits the public key pk and the decryption key sk.

Figure 13:
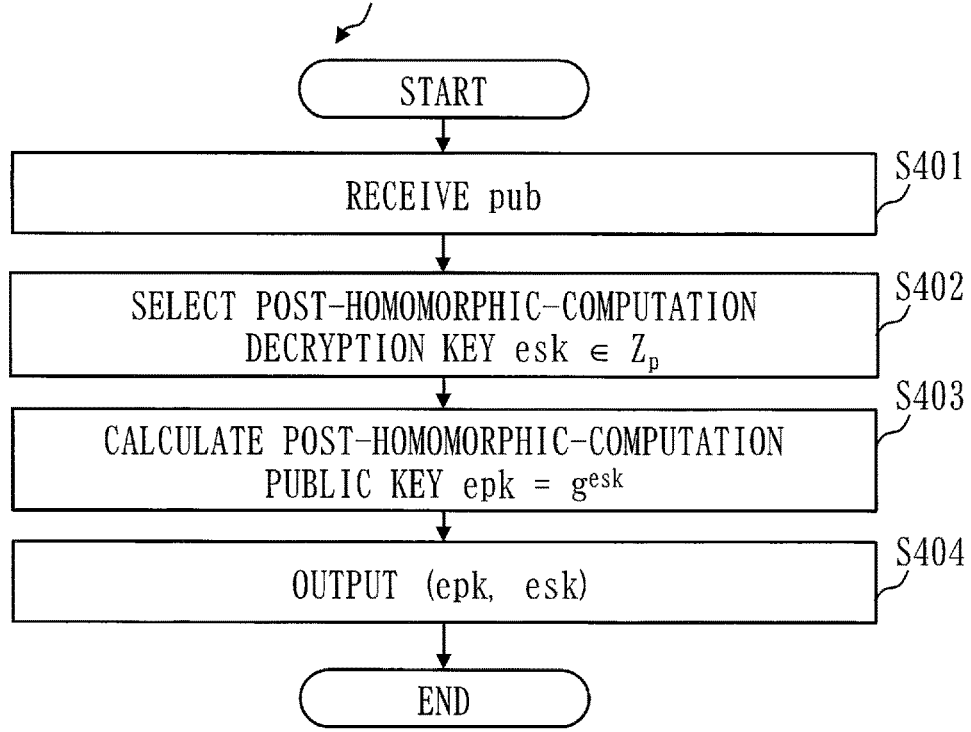
FIG. 13 is a diagram of Embodiment 1 and is a flowchart illustrating processing of the second key generation device.

FIG. 13 is a flowchart showing operation of the second key generation device 400. As illustrated in FIG. 20, the second key generation device 400 receives the common parameter pub, generates the second public key epk and the second decryption key esk by using the common parameter pub, and outputs the second public key epk and the second decryption key esk. The second public key epk is used to generate the conversion key rk and encrypt the encrypted-text RC to the encrypted text EC. The second decryption key esk is used to decrypt the encrypted text EC.

In Step S401, the input unit 401 receives the common parameter pub.

In Step S402, the key generation unit 402 selects a decryption key esk∈$Z_p$ at random by using the common parameter pub.

In Step S403, the key generation unit 402 calculates a public key epk=$g^{esk}$.

In Step S404, the key transmission unit 403 transmits the second public key epk and the second decryption key esk.

Figure 14:
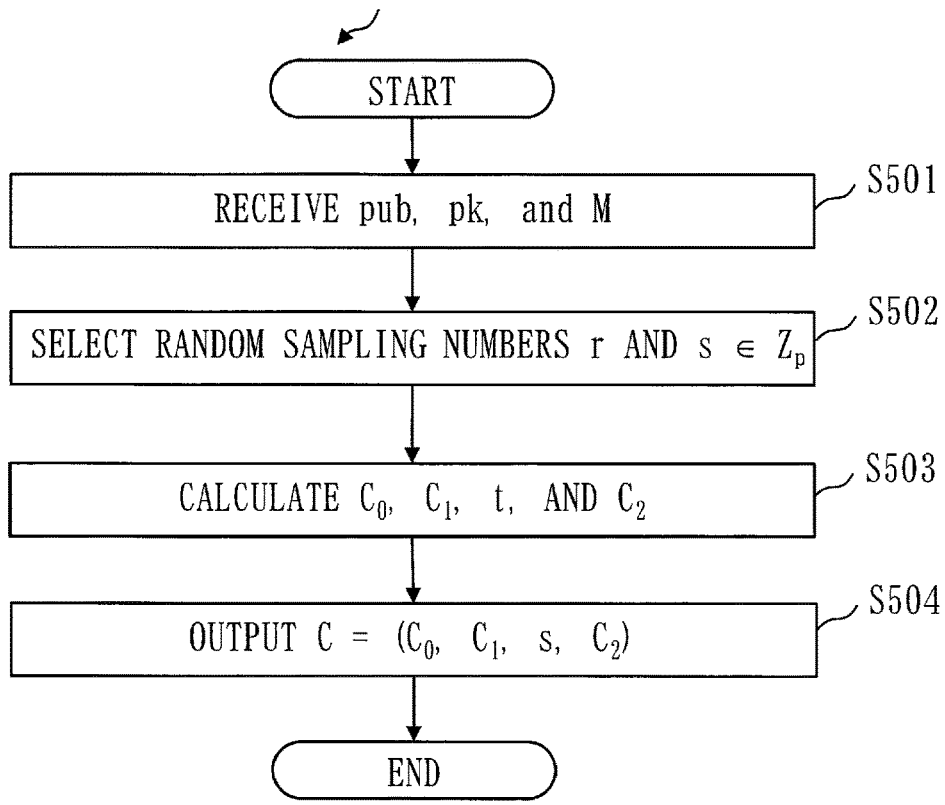
FIG. 14 is a diagram of Embodiment 1 and is a flowchart illustrating processing of the encryption device.

FIG. 14 is a flowchart illustrating operation of the encryption device 500. An encryption method using the encryption device 500 will be described with reference to FIG. 14. As illustrated in FIG. 20, the encryption device 500 receives the common parameter pub and the public key pk. Further, the encryption device 500 acquires the plain text M. The encryption device 500 generates and outputs the encrypted text C.

In Step S501, the reception unit 501 receives the common parameter pub and the public key pk. The storage unit 502 stores the common parameter pub and the public key pk. The input unit 503 receives the plain text M.

In Step S502, the encryption unit 504 selects random sampling numbers r and $s \in Z_p$ at random by using the common parameter pub.

In Step S503, the encryption unit 504 encrypts the plain text M by using the first public key pk that is one of the pair of keys, thereby generating the encrypted text D into which the plain text M is encrypted and which can be subjected to homomorphic computation.

Specifically, the encryption unit 504 calculates $$C_0 = M \cdot P^r \quad \text{(Expression 1)}$$

$$C_1 = pk^r \quad \text{(Expression 2)}$$

for the encrypted text D.

$$D = (C_0, C_1)$$

is satisfied. Herein, the symbol "·" denotes multiplication defined in the group G.

In Expression 1 and Expression 2,
the symbol "M" is the plain text.
The symbol "P" is pairing computation P included in the common parameter pub.
The random sampling number r is selected in S502.
The symbol "pk" is the first public key pk.

As described above, the encryption unit 504 selects the first random sampling number r and the second random sampling number s and generates the encrypted text D by using not only the first public key pk but also the first random sampling number r and the common parameter pub.

Further, the detection element generation unit 505 generates the detection element E used to detect a change in the encrypted text D by using the first public key pk and the encrypted text $D = (C_0, C_1)$.

Specifically, the detection element generation unit 505 calculates $$t = H(k, (pk, C_0, C_1)) \quad \text{(Expression 3)}$$

$$C_2 = (U^s V^t W)^r \quad \text{(Expression 4)}.$$

In (Expression 3) and (Expression 4),
the right side "$H(k, (pk, C_0, C_1))$" in Expression 3 indicates that $(pk, C_0, C_1)$ is encrypted by using the hash function H and the hash key k. Information of the hash function H and the hash key k is included in the common parameter pub. The symbols "U", "V", and "W" on the right side of Expression 4 are included in the common parameter pub. The symbol "t" is obtained by Expression 3, and the random sampling number r and the random sampling number s are random sampling numbers in S502. The random sampling number r is referred to as "first random sampling number", and the random sampling number s is referred to as "second random sampling number". As shown in Expression 3 and Expression 4, the detection element generation unit 505 generates the detection element E by using not only the first public key pk and the encrypted text D but also the first random sampling number r, the second random sampling number s, and the common parameter pub.

In Step S504, the transmission unit 506 outputs $C = (C_0, C_1, s, C_2)$.

$$C = (C_0, C_1, s, C_2) = (D, E)$$

is satisfied. Herein, $C_0$ and $C_1$ correspond to the encrypted text D, and $C_2$ corresponds to the detection element E.

The transmission unit 506, which is an output unit, outputs the encrypted text D and the detection element E.

Figure 15:
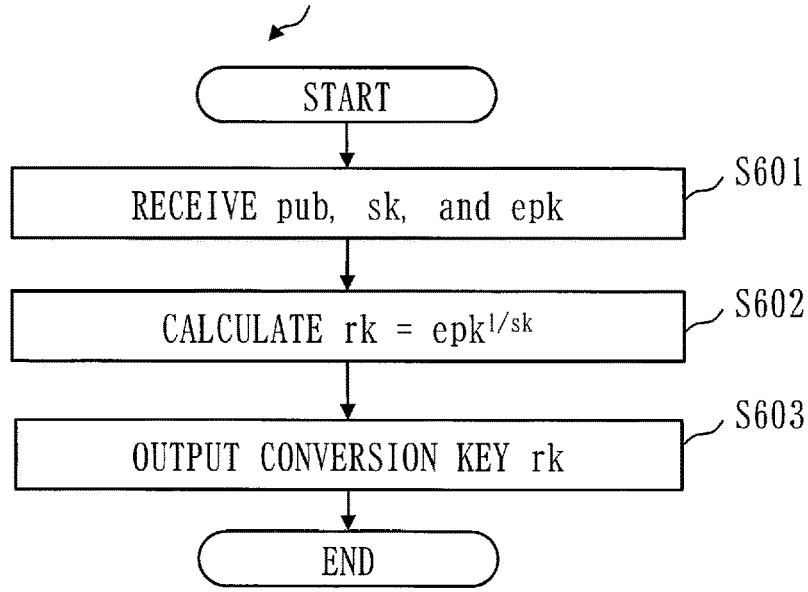
FIG. 15 is a diagram of Embodiment 1 and is a flowchart illustrating processing of the conversion key generation device.

FIG. 15 is a flowchart illustrating operation of the conversion key generation device 600. As illustrated in FIG. 20, the conversion key generation device 600 receives the common parameter pub, the first decryption key sk, and the second public key epk and generates and outputs the conversion key rk.

In Step S601, the reception unit 601 receives the decryption key sk, and the storage unit 602 stores the decryption key sk. The input unit 603 receives the second public key epk.

In Step S602, the conversion key generation unit 604 calculates $$rk = epk^{1/sk}.$$

The conversion key rk is generated on the basis of the second public key epk paired with the second secret key esk (second decryption key) which is used to decrypt a computation result of homomorphic computation in a case where the encrypted text D is subjected to homomorphic computation and the first decryption key sk (first secret key).

In Step S603, the transmission unit 605 outputs the conversion key rk.

Figure 16:
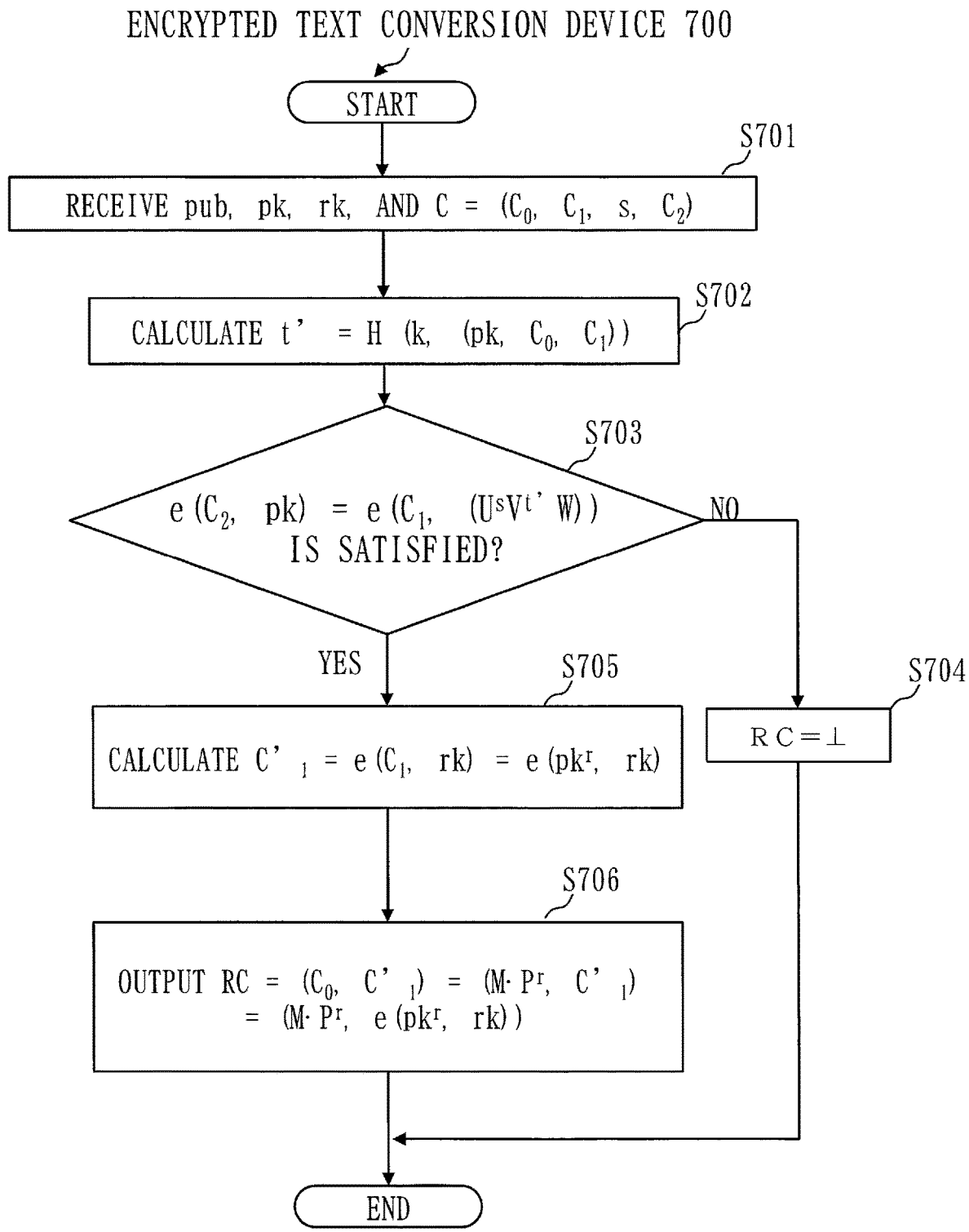
FIG. 16 is a diagram of Embodiment 1 and is a flowchart illustrating processing of the encrypted text conversion device.

FIG. 16 is a flowchart illustrating operation of the encrypted text conversion device 700. An encrypted text conversion method using the encrypted text conversion device 700 will be described with reference to FIG. 16. As illustrated in FIG. 20, the encrypted text conversion device 700 receives the common parameter pub, the first public key pk, the conversion key rk, and $C = (D, E) = (C_0, C_1, s, C_2)$, converts the encrypted text C into the encrypted-text RC, and outputs the encrypted-text RC.

In Step S701, the reception unit 701 receives the conversion key rk. The storage unit 702 stores the conversion key rk, the common parameter pub, the first public key pk, and the like. The conversion key rk is used for conversion into the converted encrypted-text RC that is an encrypted text different from the encrypted text D. The input unit 703 receives the encrypted text $C = (D, E)$ and the first public key pk. The encrypted text C includes the encrypted text D into which the plain text M has been encrypted and the detection element E. The encrypted text D can be subjected to homomorphic computation. As described above, the input unit 703, which is an acquisition unit, acquires the encrypted text D into which the plain text M is encrypted and which can be subjected to homomorphic computation and the detection element E used to detect a change in the encrypted text D.

In Step S702,
the change detection unit 704 calculates $$t' = H(k, (pk, C_0, C_1)).$$

The expression "$t' = H(k, (pk, C_0, C_1))$" means that $(pk, C_0, C_1)$ is encrypted by using the hash function H and the hash key k. The symbols "$C_0$" and "$C_1$" are included in the encrypted text C.

In Step S703, the change detection unit 704 verifies whether or not $$e(C_2, pk) = e(C_1, (U^s V^{t'} W))$$

is satisfied. In a case where $e(C_2, pk)=e(C_1, (U^sV^{t'}W))$ is satisfied, i.e., a change is not detected, the processing proceeds to Step S705. In a case where $e(C_2, pk)=e(C_1, (U^sV^{t'}W))$ is not satisfied, i.e., a change is detected, the processing proceeds to Step S704.

As described above, the change detection unit 704 generates a reference value $e(C_2, pk)$, which is a reference used to determine whether or not the encrypted text D has been changed, on the basis of $C_2$ that is the detection element E and generates a collation value $e(C_1, (U^sV^{t'}W))$, which is to be collated with the reference value, on the basis of the encrypted text D. The collation value $e(C_1, (U^sV^{t'}W))$ includes $$t'=H(k,(pk,C_0,C_1)).$$

In t', the symbols "$C_0$" and "$C_1$" are the encrypted text D.

Therefore, the collation value $e(C_1, (U^sV^{t'}W))$ is generated on the basis of the encrypted text D.

The change detection unit 704 collates the reference value with the collation value.

More specifically, the change detection unit 704 generates the reference value $e(C_2, pk)$ on the basis of the detection element E and the first public key pk and generates the collation value $e(C_1, (U^sV^{t'}W))$ on the basis of the first public key pk and the encrypted text D.

In Step S704, $RC=\perp$ is satisfied in the encrypted text conversion unit 705.

The symbol "$\perp$" is a special symbol indicating failure of conversion and may be any symbol as long as the symbol specifies that conversion of an encrypted text fails.

In Step S705, the encrypted text conversion unit 705 calculates $$C'_1=e(C_1,rk)=e(pk^r,rk)$$

and generates a converted encrypted-text $RC=(C_0, C'_1)=(M \cdot P^r, e(pk^r, rk))$. As described above, in a case where a change in the encrypted text D is not detected as a result of collation using the change detection unit 704, the encrypted text conversion unit 705, which is a conversion unit, converts the encrypted text D into the converted encrypted-text RC converted from the encrypted text D by using the conversion key rk.

In Step S706, the transmission unit 706, which is an output unit, outputs the converted encrypted-text $RC=(C_0, C'_1)$.

Figure 17:
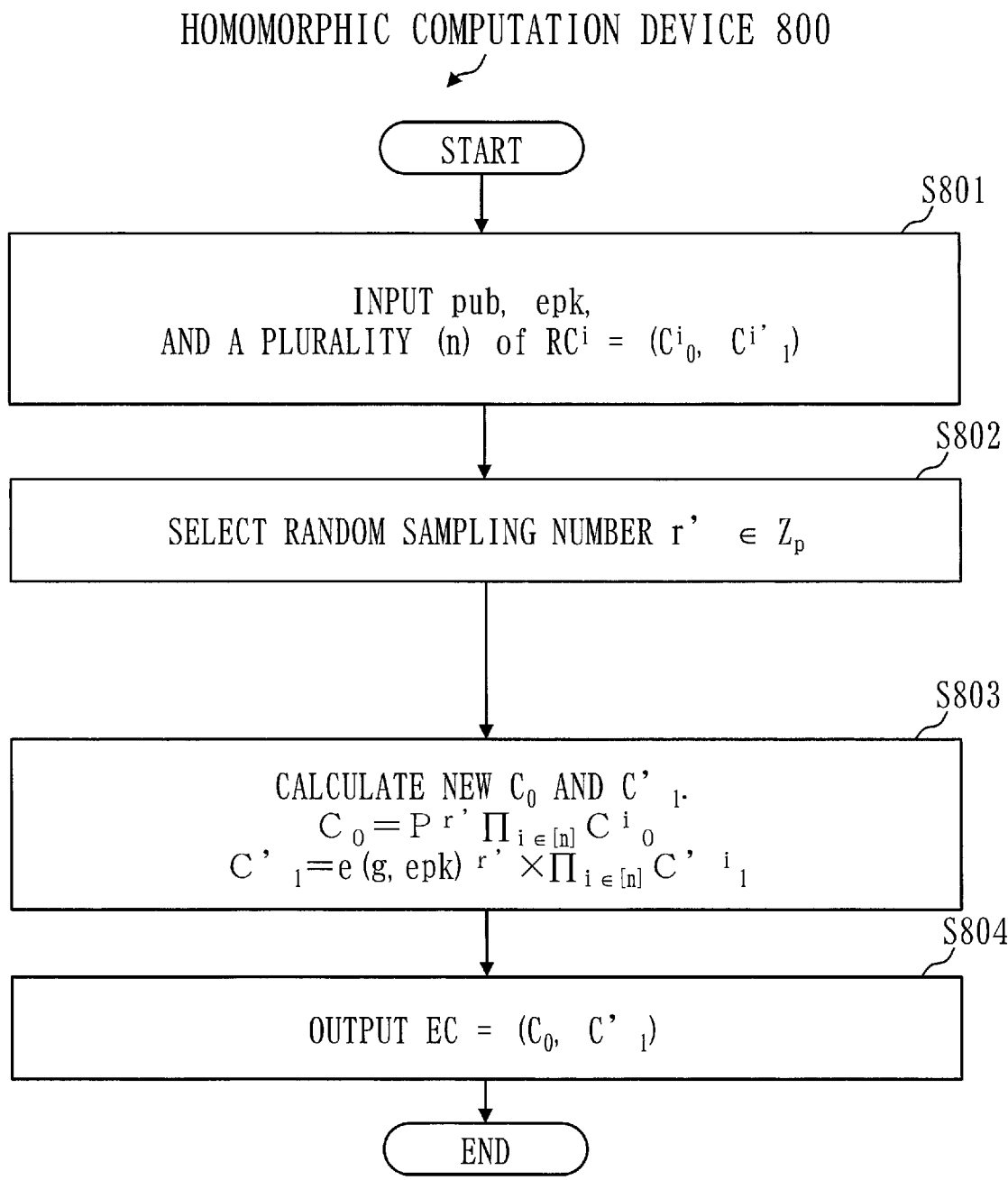
FIG. 17 is a diagram of Embodiment 1 and is a flowchart illustrating processing of the homomorphic computation device.

FIG. 17 is a flowchart illustrating operation of the homomorphic computation device 800. As illustrated in FIG. 20, the homomorphic computation device 800 receives the common parameter pub, the second public key epk, and a plurality (n) of RCs. Each of then RCs is denoted by $RC^i$.

In Step S801, the reception unit 801 receives the encrypted-texts RC that have been converted, and the storage unit 802 stores the encrypted-texts RC. Then, the input unit 803 receives the second public key epk.

In Step S802, the homomorphic computation unit 804 selects a random sampling number $r' \in Z_p$.

In Step S803, the homomorphic computation unit 804 newly calculates $C_0$ and $C'_1$ on the left side in the following expressions.

In the following expressions, it is assumed that a request for results of homomorphic computation obtained in the following expressions has been issued. The homomorphic computation unit 804 computes the following expressions in response to this request.

$$C_0=P^{r'}\Pi_{i\in[n]}C^i_0$$

$$C'_1=e(g,epk)^{r'}\times\Pi_{i\in[n]}C'^i_1$$

are calculated.

In Step S804, the transmission unit 805 outputs $$EC=(C_0,C'_1),$$

which is the encrypted text EC that has been subjected to the above homomorphic computation.

Figure 18:
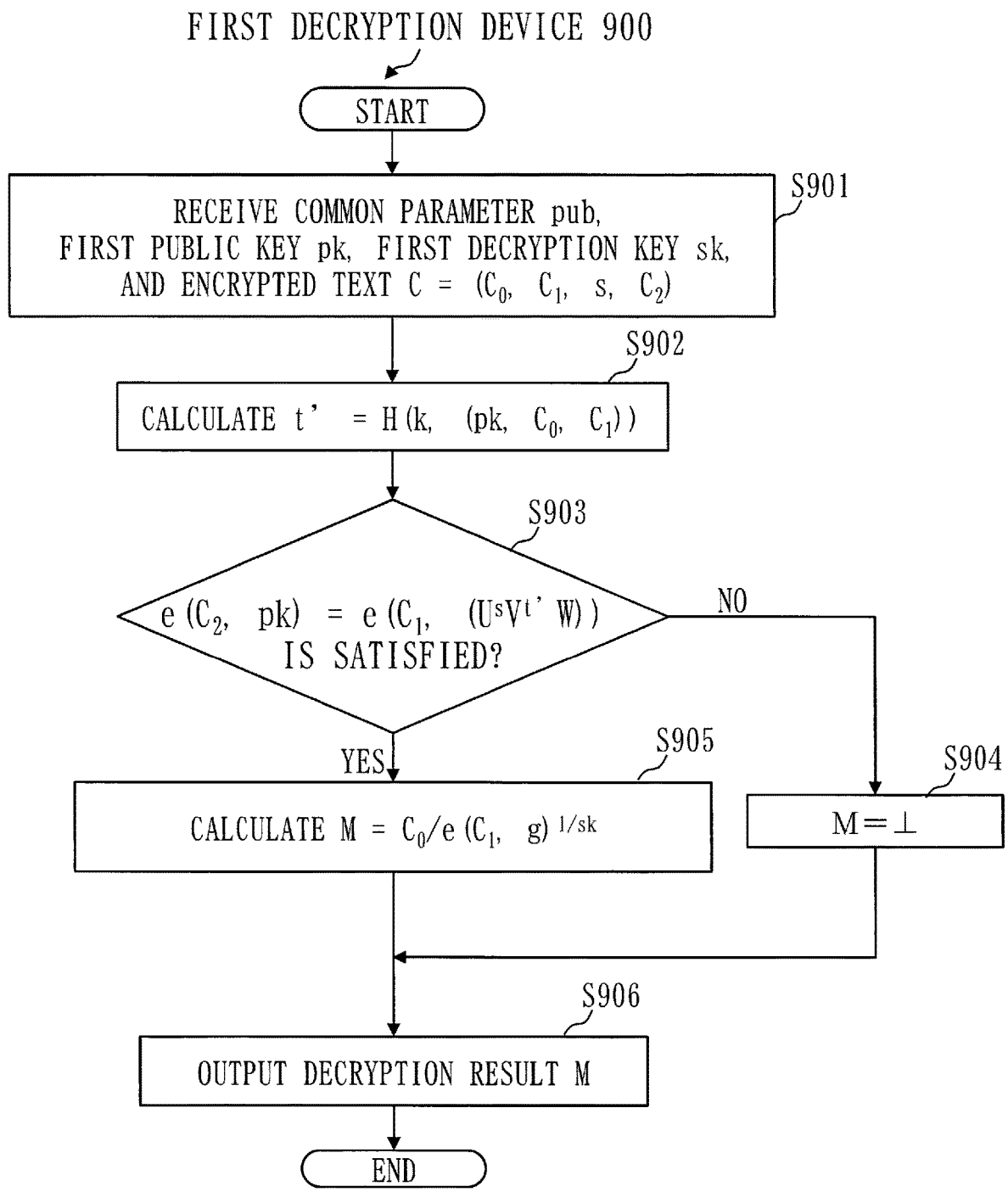
FIG. 18 is a diagram of Embodiment 1 and is a flowchart illustrating processing of the first decryption device.

FIG. 18 is a flowchart illustrating operation of the first decryption device 900.

As illustrated in FIG. 20, the first decryption device 900 receives the common parameter pub, the first public key pk, the first decryption key sk, and the encrypted text $C=(C_0, C_1, s, C_2)$. The first decryption device 900 decrypts the encrypted text C to the plain text M.

In Step S901, the reception unit 901 receives the common parameter pub, the first public key pk, and the first decryption key sk. The storage unit 902 stores the common parameter pub, the first public key pk, and the first decryption key sk. The input unit 903 receives the encrypted text C.

In Step S902, the decryption processing unit 904 calculates $$t'=H(k,(pk,C_0,C_1)).$$

In Step S903, the decryption processing unit 904 verifies whether or not $$e(C_2,pk)=e(C_1,(U^sV^{t'}W))$$

is satisfied. In a case where $e(C_2, pk)=e(C_1, (U^sV^{t'}W))$ is satisfied, the processing proceeds to Step S905. In a case where $e(C_2, pk)=e(C_1, (U^sV^{t'}W))$ is not satisfied, the processing proceeds to Step S904.

In Step S904, $$M=\perp$$

is satisfied in the decryption processing unit 904. The symbol "1" is a special symbol indicating failure of conversion and may be any symbol as long as the symbol specifies that conversion of an encrypted text fails.

In Step S905, the decryption processing unit 904 calculates $$M=C_0/e(C_1,g)^{1/sk}.$$

In Step S906, the transmission unit 905 outputs a decryption result M.

Figure 19:
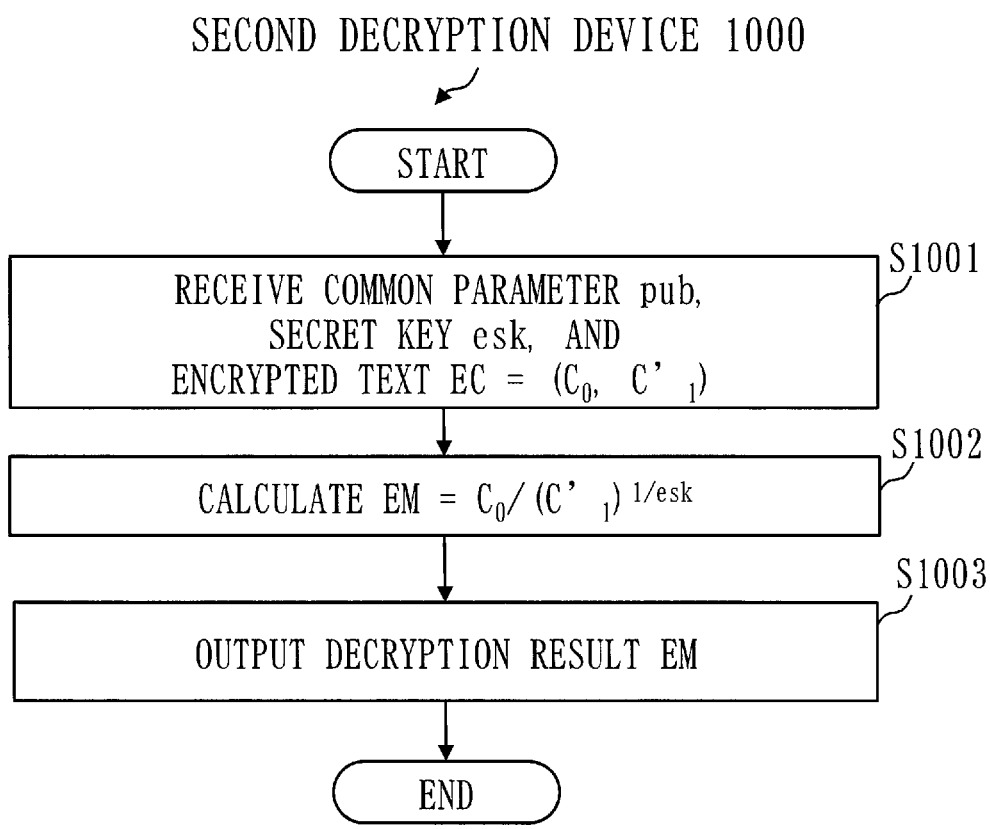
FIG. 19 is a diagram of Embodiment 1 and is a flowchart illustrating processing of the second decryption device.

FIG. 19 is a flowchart illustrating operation of the second decryption device 1000. As illustrated in FIG. 20, the second decryption device 1000 accepts the common parameter pub, the second secret key esk, and the encrypted text $EC=(C_0, C'_1)$. The second decryption device 1000 decrypts the encrypted text EC and outputs the decryption result EM.

In Step S1001, the reception unit 1001 receives the second decryption key esk, and the storage unit 1002 stores the second decryption key esk. The input unit 1003 receives the encrypted text EC that has been subjected to homomorphic computation.

In Step S1002, the decryption processing unit 1004 calculates $$EM=C_0/(C'_1)^{1/esk}.$$

In Step S1003, the transmission unit 1005 outputs the decryption result EM.

<*Description of Effects of Embodiment 1*>

This embodiment has the following effects.

(1) In this embodiment, even data encrypted by using different public keys can be converted into encrypted texts having the same second public key epk by using a conversion key. With this, it is possible to compute plain texts by using a homomorphic computation device while information of the individual encrypted texts are being kept secret.

(2) In this embodiment, the plain text M in the encrypted text C cannot be changed because a verification expression using t is used in decryption processing in the decryption device to check the encrypted text C. However, by using the conversion key, encrypted texts can be converted into encrypted texts of the same second public key epk. Therefore, it is possible to compute plain texts by using the homomorphic computation device while information of the individual encrypted texts are being kept secret.

(3) In this embodiment, although safety of the encrypted text C using the public key pk can be extremely high, it is possible to compute the plain text M while the encrypted text C is being kept secret. Therefore, it is possible to achieve a safe confidential analysis system.

(4) The encryption device causes the encrypted text C to include not only the encrypted text D but also the detection element E for detecting a change in the encrypted text D. Therefore, it is possible to prevent a change in the encrypted text D.

(5) In a case where whether or not the encrypted text D has been changed is verified by using the detection element E and then it is determined that the encrypted text D has not been changed, the encrypted text conversion device converts the encrypted text C into the encrypted-text RC. Therefore, it is possible to provide the encrypted text C that has not been changed to the homomorphic computation device.

\*\*\*Other Configurations\*\*\*

Further, in this embodiment, the function of the "unit" serving as the processor 91 is achieved by software. However, the function of the "unit" serving as the processor 91 may be achieved by hardware as a modification example.

Figure 22:
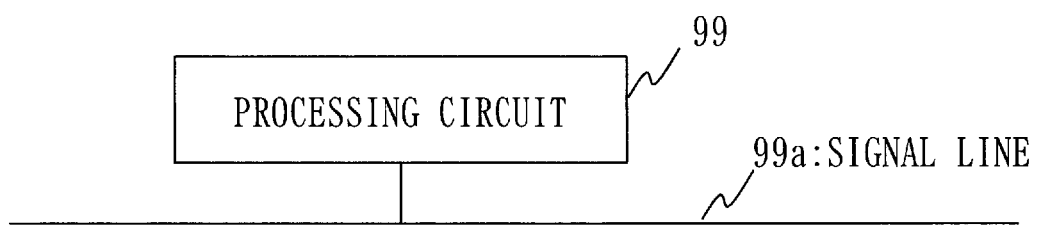

FIG. 22 illustrates a case where the function of the "unit" serving as the processor 91 is achieved by a processing circuit 99 that is hardware. The processing circuit 99 is connected to a signal line 99a. The processing circuit 99 achieves the function of the "unit" serving as the processor 91 described above and a function of the "storage unit". The processing circuit 99 is a dedicated electronic circuit that achieves the function of the "unit" serving as the processor 91 and the function of the "storage unit". The processing circuit 99 is specifically a single circuit, multiple circuits, a programmed processor, multiple programmed processors, a logic IC, a gate array (GA), an application specific integrated circuit (ASIC), or a field-programmable gate array (FPGA).

The function of the "unit" serving as the processor 91 may be achieved by a single processing circuit 99 or may be dispersively achieved by a plurality of processing circuits 99.

As another modification example, the devices illustrated in FIG. 2 to FIG. 10 may be achieved by a combination of software and hardware. That is, part of functions of the devices illustrated in FIG. 2 to FIG. 10 may be achieved by dedicated hardware, and remaining functions thereof may be achieved by software.

The processor 91, the storage device 92, and the processing circuit 99 are collectively referred to as "processing circuitry". In other words, the function of the "unit" serving as the processor 91 and the "storage unit" in FIG. 2 to FIG. 10 are achieved by the processing circuitry.

The "unit" serving as the processor 91 may be read as "step", "procedure", or "processing". Further, the function of the "unit" serving as the processor 91 may be achieved by firmware.

Further, operation of the common parameter generation device 200 to the second decryption device 1000 illustrated in FIG. 2 to FIG. 10 can be grasped as methods and programs. The encryption device 500 is operated by an encryption program.

Operation of the encryption device 500 is an encryption method. Further, the encrypted text conversion device 700 is operated by an encrypted text conversion program. Operation of the encrypted text conversion device 700 is an encrypted text conversion method.

Note that, although the public key pk and the decryption key sk are used in Embodiment 1, a role of the public key pk and a role of the decryption key may be switched and the public key pk may be used for decryption. The same applies to the public key epk and the decryption key esk.

REFERENCE SIGNS LIST pub: common parameter, RC: encrypted-text, pk: first public key, sk: first decryption key, epk: second public key, esk: second decryption key, rk: conversion key, 91: processor, 92: storage device, 93: input I/F, 94: output I/F, 99: processing circuit, 99a: signal line, 100: confidential analysis system, 101: Internet, 200: common parameter generation device, 201: input unit, 202: common parameter generation unit, 203: transmission unit, 300: first key generation device, 301: input unit, 302: key generation unit, 303: key transmission unit, 400: second key generation device, 401: input unit, 402: key generation unit, 403: key transmission unit, 500: encryption device, 501: reception unit, 502: storage unit, 503: input unit, 504: encryption unit, 505: detection element generation unit, 506: transmission unit, 600: conversion key generation device, 601: reception unit, 602: storage unit, 603: input unit, 604: conversion key generation unit, 605: transmission unit, 700: encrypted text conversion device, 701: reception unit, 702: storage unit, 703: input unit, 704: change detection unit, 705: encrypted text conversion unit, 706: transmission unit, 800: homomorphic computation device, 801: reception unit, 802: storage unit, 803: input unit, 804: homomorphic computation unit, 805: transmission unit, 900: first decryption device, 901: reception unit, 902: storage unit, 903: input unit, 904: decryption processing unit, 905: transmission unit, 1000: second decryption device, 1001: reception unit, 1002: storage unit, 1003: input unit, 1004: decryption processing unit, 1005: transmission unit.

The invention claimed is:

1. An encrypted text conversion device comprising:
processing circuitry to acquire data C that has not yet been subjected to homomorphic computation, the data C including an encrypted text D into which a plain text M is encrypted and which can be subjected to homomorphic computation and a detection element E used to detect a change in the encrypted text D; and
a memory to store a conversion key rk used for conversion into a converted encrypted-text RC that is an encrypted text different from the encrypted text D and is an encrypted text that can be subjected to homomorphic computation;
wherein the processing circuitry:
generates a reference value that is a reference used to determine whether or not the encrypted text D has been changed on the basis of the detection element E included in the data C,
generates a collation value to be collated with the reference value on the basis of the encrypted text D included in the data C, collates the reference value with the collation value, detects a change in the data C, converts the encrypted text D into the converted encrypted-text RC that can be subjected to homomorphic computation by using the conversion key rk in a case where a change in the encrypted text D is not detected as a result of collation, and outputs the converted encrypted-text RC.

2. The encrypted text conversion device according to claim 1, wherein:

the memory further stores a public key pk and a common parameter pub;

the common parameter pub is used to generate the conversion key rk and includes an element U, an element V, and an element W as elements, where the element $U=g^u$, the element $V=g^v$, and the element $W=g^w$, u, v, and w are integers belonging to an aggregation $Z_p$ of integers of mod P, and g is an element belonging to a group G in a case where e is a bilinear mapping having a mapping of $G \times G \rightarrow G_T$; and the processing circuitry acquires $C=(C_0, C_1, s, C_2)$ as the data C that has not yet been subjected to homomorphic computation, where $(C_0, C_1)$ is the encrypted text D, s is a random sampling number belonging to the aggregation $Z_P$ of the integers of the mod P, and $C_2$ is the detection element E, calculates $t'=H(k, (pk, C_0, C_1)$ into which the public key pk and the encrypted text $D=(C_0, C_1)$ are encrypted by using a hash function H and a hash key k, generates, as the collation value, $e(C_1, (U^s V^{t'} W))$ that is pairing computation of $C_1$ and $(U^s V^{t'} W)$ by using $C_1$ included in the data C, the element U, the element V, and the element W included in the common parameter pub, the random sampling number s included in the data C, and a calculated value t' obtained by calculation, generates, as the reference value, $e(C_2, pk)$ that is pairing computation of $C_2$ and the public key pk by using $C_2$ included in the data C and the public key pk, and collates $e(C_2, pk)$ generated as the reference value with $e(C_1, (U^s V^{t'} W))$ generated as the collation value.

3. The encrypted text conversion device according to claim 2, wherein:

the conversion key rk is generated as $rk=epk^{1/SK}$ on the basis of a secret key sk paired with the public key pk and a second public key epk paired with a second secret key esk that is a decryption key used to decrypt a computation result of homomorphic computation in a case where the encrypted text $D=(C_0, C_1)$ is subjected to homomorphic computation; and the processing circuitry generates $C'_1=e(C_1, rk)$ that is pairing computation of $C_1$ and the conversion key rk by using $C_1$ included in the data C and the conversion key rk in a case where a change in the encrypted text D is not detected, and generates, as the converted encrypted-text RC that can be subjected to homomorphic computation, $e(C_0, C'_1)$ that is pairing computation of $C_0$ and $C'_1$ by using $C_0$ included in the data C and the generated $C'_1$.

4. A non-transitory computer readable medium storing an encrypted text conversion program for causing a computer to execute:

processing of acquiring data C that has not yet been subjected to homomorphic computation, the data C including an encrypted text D into which a plain text M is encrypted and which can be subjected to homomorphic computation and a detection element E used to detect a change in the encrypted text D;

processing of storing a conversion key rk used for conversion into a converted encrypted-text RC that is an encrypted text different from the encrypted text D and is an encrypted text that can be subjected to homomorphic computation;

processing of generating a reference value that is a reference used to determine whether or not the encrypted text D has been changed on the basis of the detection element E included in the data C, generating a collation value to be collated with the reference value on the basis of the encrypted text D included in the data C, collating the reference value with the collation value, and detecting a change in the data C;

processing of converting the encrypted text D into the converted encrypted-text RC that can be subjected to homomorphic computation by using the conversion key rk in a case where a change in the encrypted text D is not detected as a result of collation; and processing of outputting the converted encrypted-text RC.

5. An encrypted text conversion method performed by an encrypted text conversion device including processing circuitry and a memory, wherein:

the processing circuitry acquires data C that has not yet been subjected to homomorphic computation, the data C including an encrypted text D into which a plain text M is encrypted and which can be subjected to homomorphic computation and a detection element E used to detect a change in the encrypted text D;

the memory stores a conversion key rk used for conversion into a converted encrypted-text RC that is an encrypted text different from the encrypted text D and is an encrypted text that can be subjected to homomorphic computation; and the processing circuitry generates a reference value that is a reference used to determine whether or not the encrypted text D has been changed on the basis of the detection element E included in the data C, generates a collation value to be collated with the reference value on the basis of the encrypted text D included in the data C, collates the reference value with the collation value, detects a change in the data C, converts the encrypted text D into the converted encrypted-text RC that can be subjected to homomorphic computation by using the conversion key rk in a case where a change in the encrypted text D is not detected as a result of collation, and outputs the converted encrypted-text RC.

* * * * *